(12) United States Patent
Lee

(10) Patent No.: US 11,601,998 B2
(45) Date of Patent: Mar. 7, 2023

(54) ELECTRONIC DEVICE SUPPORTING DUAL-CONNECTIVITY AND METHOD FOR OPERATING THE SAME

(71) Applicant: Samsung Electronics Co., Ltd., Gyeonggi-do (KR)

(72) Inventor: Shinduck Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 17/099,851

(22) Filed: Nov. 17, 2020

(65) Prior Publication Data

US 2021/0307096 A1 Sep. 30, 2021

(30) Foreign Application Priority Data

Mar. 30, 2020 (KR) ........................ 10-2020-0038398

(51) Int. Cl.
*H04W 76/15* (2018.01)
*H04W 24/10* (2009.01)
(Continued)

(52) U.S. Cl.
CPC .......... *H04W 76/15* (2018.02); *H04B 17/318* (2015.01); *H04B 17/336* (2015.01);
(Continued)

(58) Field of Classification Search
None
See application file for complete search history.

(56) References Cited

U.S. PATENT DOCUMENTS

2018/0192345 A1\* 7/2018 Yun ........................ H04W 36/30
2018/0368016 A1 12/2018 Lee et al.
(Continued)

FOREIGN PATENT DOCUMENTS

| KR | 10-2014-0030553 A | 3/2014 | |
|---|---|---|---|
| WO | WO-2020167182 A1 \* | 8/2020 | ............ H04W 24/10 |
| WO | WO-2021129244 A1 \* | 7/2021 | ............ H04W 76/19 |

OTHER PUBLICATIONS

AT&T; 5G icon erroneously displayed; R2-1908858; 3GPP TSG-RAN WG2 Meeting #107; Prague, Czech Republic, Aug. 14, 2019.
(Continued)

*Primary Examiner* — Scott M Sciacca
(74) *Attorney, Agent, or Firm* — Cha & Reiter, LLC

(57) ABSTRACT

According to an embodiment, An electronic device comprises at least one communication circuit, a display and at least one processor, wherein the at least one processor is configured to perform connection of second communication network in response to receiving an add configuration for the second communication network based on first communication network using the at least one communication circuit, with the first communication network connected, control the display to display a first indicator indicating that the second communication network is connected, based on the connection of the second communication network, measure a parameter of a signal corresponding to the second communication network, based on detection of a disconnection of the second communication network, and determine whether to display the first indicator based on the parameter of the signal. Other certain embodiments are possible as well.

20 Claims, 18 Drawing Sheets

(51) Int. Cl.
  *H04B 17/309* (2015.01)
  *H04B 17/318* (2015.01)
  *H04W 76/30* (2018.01)
  *H04W 76/27* (2018.01)
  *H04W 76/18* (2018.01)
  *H04B 17/336* (2015.01)

(52) U.S. Cl.
  CPC ........... *H04W 24/10* (2013.01); *H04W 76/18* (2018.02); *H04W 76/27* (2018.02); *H04W 76/30* (2018.02)

(56) References Cited

U.S. PATENT DOCUMENTS

| | | |
|---|---|---|
| 2019/0069229 A1 | 2/2019 | Lee et al. |
| 2019/0268833 A1 | 8/2019 | Kwok |
| 2019/0268962 A1 | 8/2019 | Wang et al. |
| 2019/0379469 A1 | 12/2019 | Lu et al. |
| 2020/0037387 A1 | 1/2020 | Lee et al. |
| 2020/0068482 A1 | 2/2020 | Lu et al. |
| 2020/0100181 A1* | 3/2020 | Jia ..................... H04W 52/0258 |
| 2020/0344839 A1* | 10/2020 | Kwok .................. H04W 76/16 |
| 2021/0014917 A1* | 1/2021 | Haberman ............ H04W 76/18 |
| 2022/0007257 A1* | 1/2022 | Wang .................. H04W 36/10 |
| 2022/0116809 A1* | 4/2022 | Cheng .................. H04W 76/30 |

OTHER PUBLICATIONS

"3GPP; TSG RAN; NR; RRC protocol specification (Release 15)"; 3GPP TS 38.331 V15.8.0; Jan. 8, 2020.

Samsung; "Support of 5G indicator in EN-DC"; R2-2001576; 3GPP TSG-RAN WG2 Meeting #109-c; Electronic meeting; Feb. 14, 2020.

International Search Report dated Mar. 2, 2021.

* cited by examiner

ELECTRONIC DEVICE SUPPORTING DUAL-CONNECTIVITY AND METHOD FOR OPERATING THE SAME

CROSS-REFERENCE TO RELATED APPLICATION(S)

This application is based on and claims priority under 35 U.S.C. 119 to Korean Patent Application No. 10-2020-0038398, filed on Mar. 30, 2020, in the Korean Intellectual Property Office, the disclosure of which is herein incorporated by reference in its entirety.

BACKGROUND

Field

Embodiments of the disclosure relate to an electronic device supporting dual-connectivity and a method for operating the electronic device.

Description of Related Art

As mobile communication technology evolves, multi-functional portable terminals are commonplace. To meet increasing demand for radio traffic, efforts are underway to develop 5G communication systems. To achieve a higher data transmission rate, 5G communication systems are being implemented on ultra-high frequency bands as well as those used for 3G and long-term evolution (LTE). With increasing demand for radio traffic, it becomes increasingly important to efficiently utilize network resources.

The above information is presented as background information only to assist with an understanding of the disclosure. No determination has been made, and no assertion is made, as to whether any of the above might be applicable as prior art with regard to the disclosure.

SUMMARY

According to an embodiment, an electronic device, comprises at least one communication circuit configured to connect with a first communication network; a display; and at least one processor, wherein the at least one processor is configured to: control the second communication network to connect with a second communication network in response to receiving an add configuration for the second communication network from the first communication network, while the at least one communication circuit is connected to the first communication network; control the display to display a first indicator indicating that the second communication network is connected, in response to connection with the second communication network; measure a parameter of a signal corresponding to the second communication network, when detecting disconnection of the second communication network; and display or not display the first indicator based on the parameter of the signal.

According to certain embodiments, a method comprises, while connected with a first communication network, connecting with a second communication network in response to receiving an add configuration for the second communication network from the first communication network; displaying a first indicator indicating that the second communication network is connected, in response to connection with the second communication network; measuring a parameter of a signal corresponding to the second communication network, when detecting disconnection of the second communication network; and displaying or not displaying the first indicator based on the parameter of the signal.

According to certain embodiments, an electronic device comprises: a display; and at least one processor, wherein the at least one processor is configured to: control the display to display a first indicator indicating that second communication network is connected, while a first communication network and the second communication network are connected; based on a disconnection of the second communication network, control the display to continue displaying the first indicator based on a parameter of a signal, which corresponds to the second communication network, meeting a predetermined condition; and control the display to display a second indicator indicating that the second communication network is disconnected, based on the parameter of the signal, which corresponds to the second communication network, not meeting the predetermined condition.

In accordance with an embodiment, a method for operating an electronic device comprises displaying a first indicator indicating that second network communication is connected, with first network communication and the second network communication simultaneously connected, based on a disconnection of the second network communication, keeping on displaying the first indicator based on a parameter of a signal, which corresponds to the second network communication, meeting a predetermined condition, and displaying a second indicator indicating that the second network communication is disconnected, based on the parameter of the signal, which corresponds to the second network communication, not meeting the predetermined condition.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

To implement 5G communication, stand-alone (SA) and non-standalone (NSA) schemes are taken into consideration. Of the two, the NSA scheme may include an E-UTRA NR dual connectivity (EN-DC) scheme that uses the new radio (NR) system along with the legacy LTE system. In the NSA scheme, user equipment (UE) may use not only eNBs of the LTE system but also gNBs of the NR system. Technology allowing UEs to use heterogeneous communication systems may be termed dual connectivity.

Dual connectivity is where the 3.5 GHz frequency band other than that for LTE system is used for small cells. For dual connectivity in the 5G EN-DC scheme, it is possible to use LTE network communication as a master node and NR network communication as a secondary node.

The user equipment (UE) may receive a message (e.g., an RRC connection reconfiguration message) intending to report at least one parameter corresponding to a neighbor cell from the master node. The UE may measure at least one parameter of a signal from the base station of the neighbor cell and report it to the master node. The master node may determine to add a specific base station as a secondary node (SN) and instruct the UE to add the secondary cell group (SCG). The UE may transmit and receive data to/from the network based on two communication networks. The UE supporting EN-DC may simultaneously support LTE communication and 5G communication. For example, the UE may transmit and receive control plane data and user plane data via LTE communication and transmit and receive user plane data via 5G communication. When 5G communication is connected, the UE may visually display a first indicator indicating that 5G communication is connected. Further, when 5G communication is disconnected, the UE may visually display a second indicator indicating that 5G communication is disconnected.

For example, when a Secondary Cell Group (SCG) reattach of 5G communication occurs at the coverage boundary or due to a network malfunction, the UE may repeatedly switch between the first indicator and the second indicator. The UE may unnecessarily waste resources for processing the first indicator and the second indicator. Further, the user may recognize it as degradation of network communication quality.

According to an embodiment, an electronic device and method for operating the electronic device may determine whether to display an indicator corresponding to communication network, which belongs to dual connectivity and is disconnected, based on the parameter of a signal corresponding to the communication network when the network communication is disconnected.

User Equipment

Figure 1:
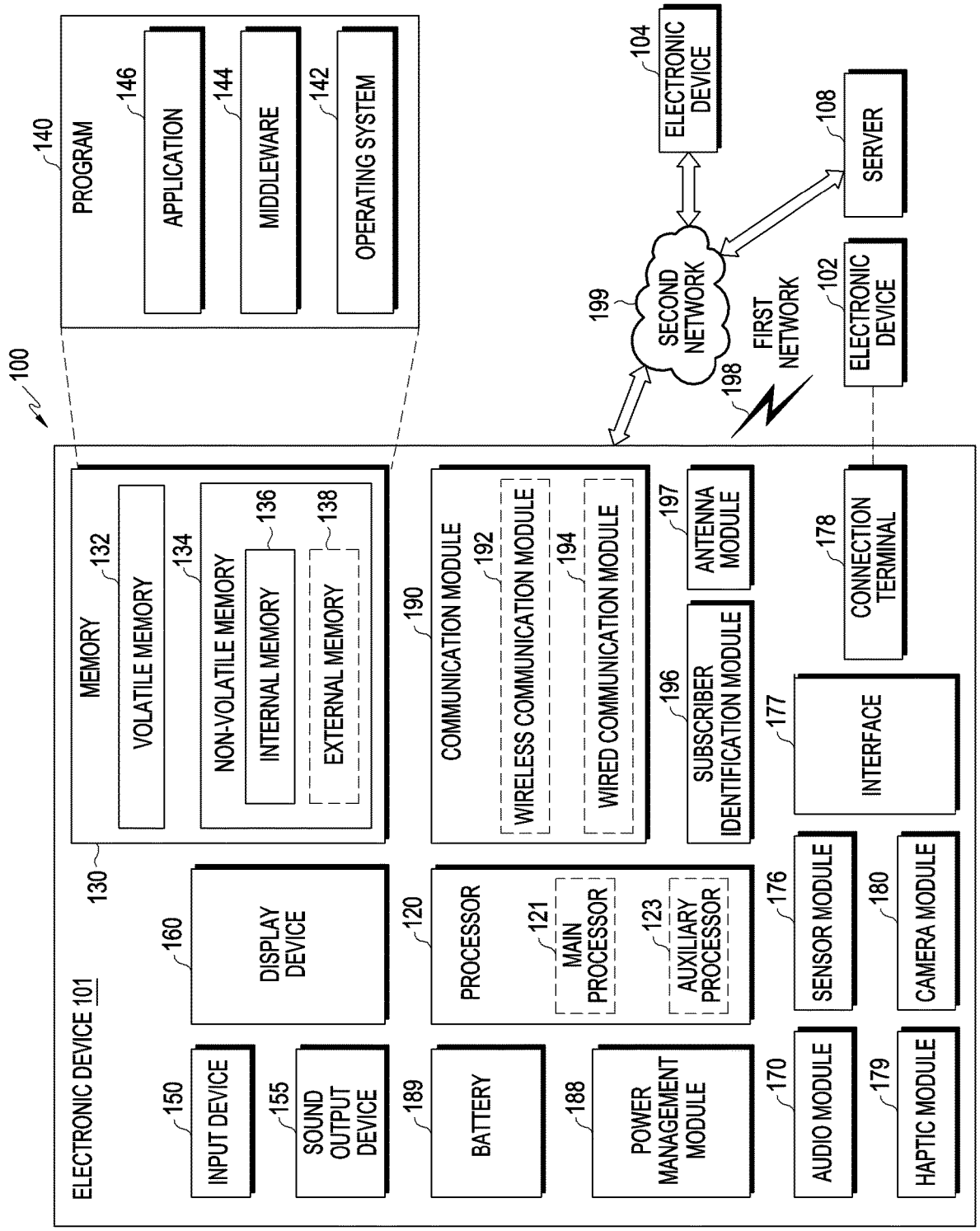
FIG. 1 is a block diagram illustrating an electronic device in a network environment according to an embodiment.

FIG. 1 is a block diagram illustrating an electronic device 101 which can be User Equipment in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. "Processor" shall be understood to refer to the singular context as well as the plural context.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In certain embodiments, while the electronic device 100 is connected to a first communication network, the processor 120 can control the communication module 190 to connect to a second communication network in response to receiving an add configuration for the second communication network from the first communication network. The processor can control the display device 160 to display a first indicator indicating that the second communication network is connected.

When the second communication network is disconnected, the electronic device 100 may visually display a second indicator indicating that the second communication network is disconnected. However, for example, when a Secondary Cell Group (SCG) reattach of 5G communication occurs at a coverage boundary or due to a network malfunction, it would be desirable to prevent the processor 120 from causing the display device 160 from repeatedly switching between the first indicator and the second indicator. When disconnection of a second communication network is detected, certain embodiments measure a parameter of a signal corresponding to a second network communication, and display or not display the first indicator based on the parameter.

Wireless Communication Module

Figure 2A:
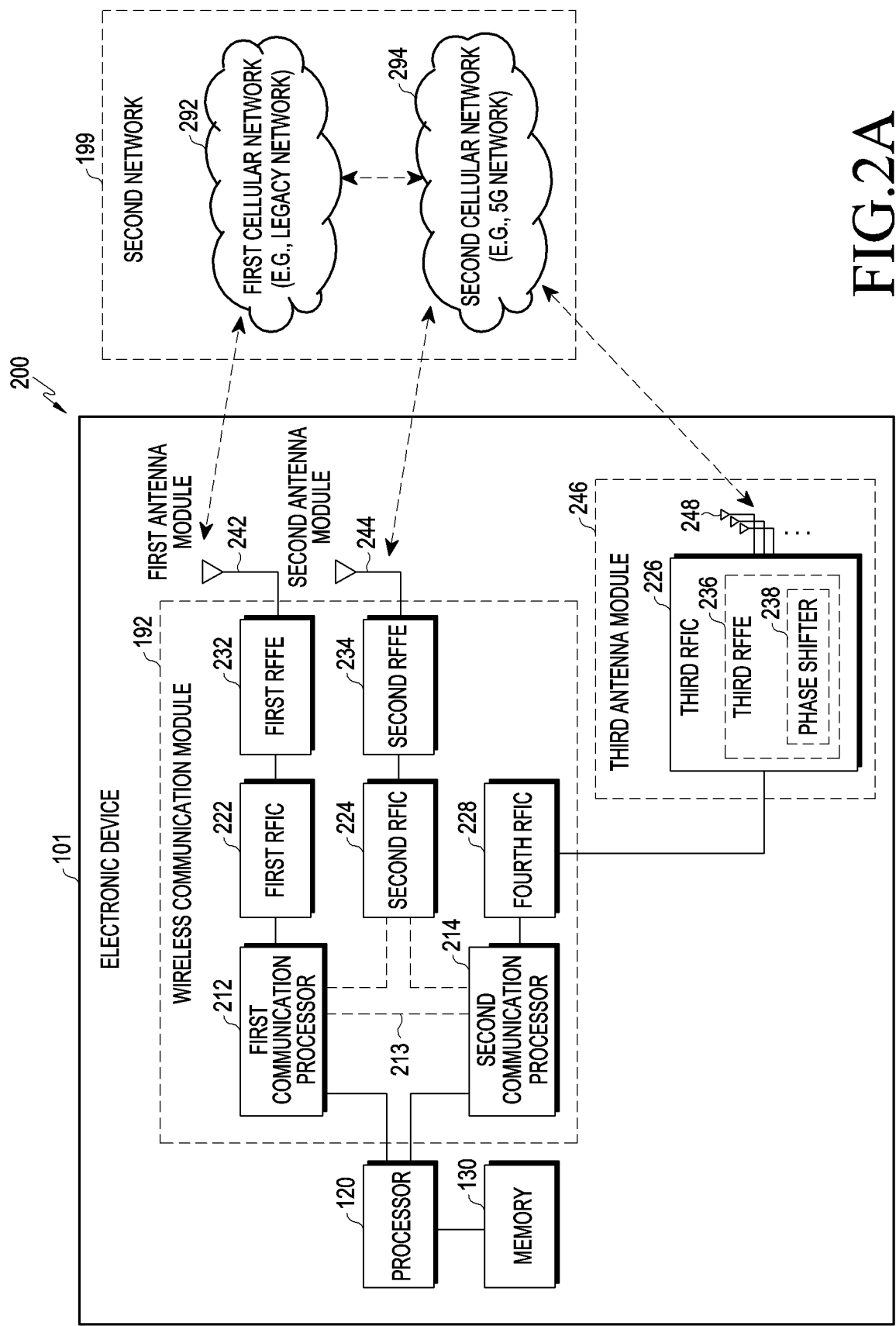
FIG. 2A is a block diagram illustrating an electronic device for supporting network communication and 5G network communication according to an embodiment.
Figure 2B:
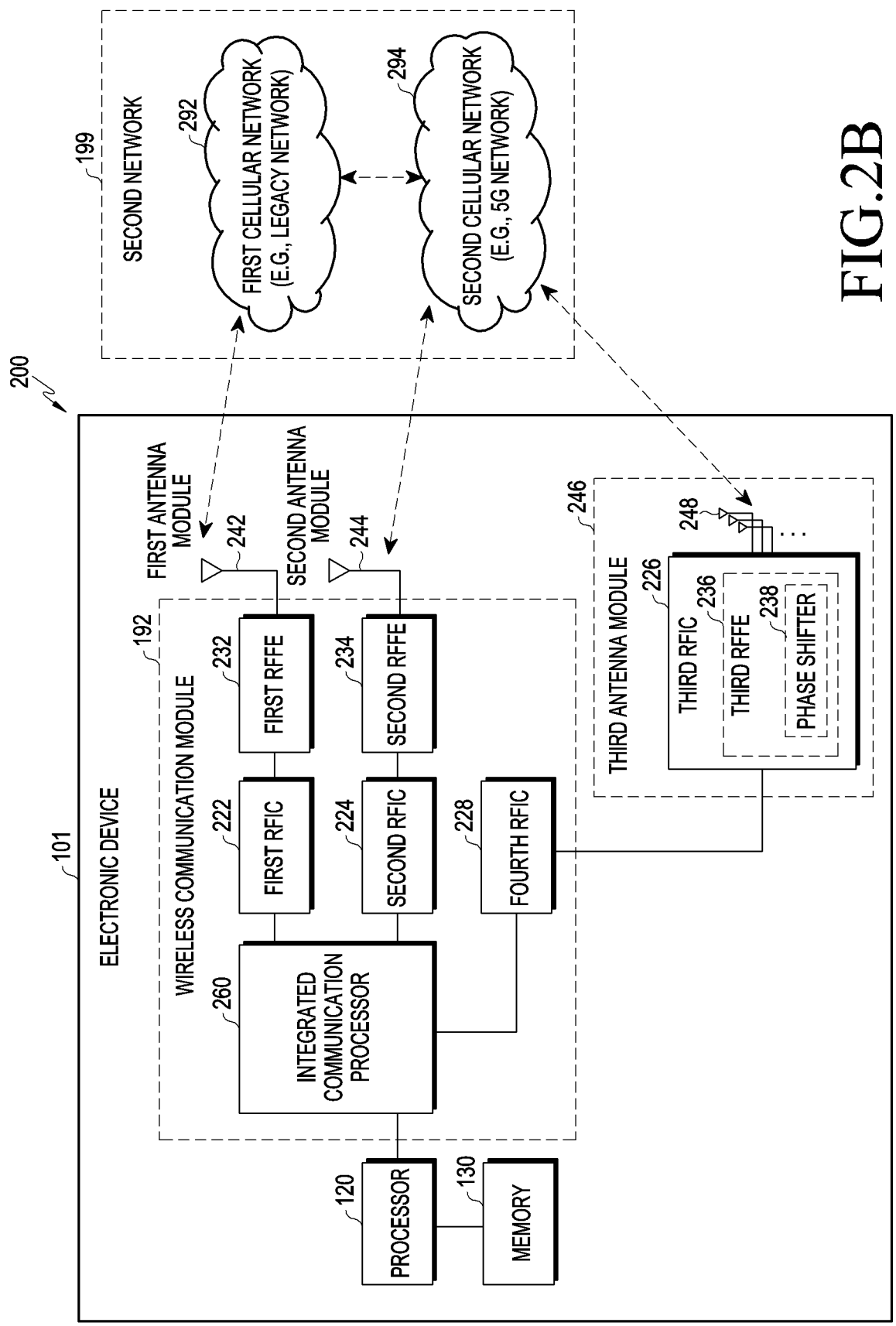
FIG. 2B is a block diagram illustrating an electronic device for supporting network communication and 5G network communication according to an embodiment.

FIG. 2A is a block diagram 200 illustrating an electronic device 101 for supporting network communication and 5G network communication according to an embodiment. FIG. 2B is a block diagram 201 illustrating an electronic device for supporting network communication and 5G network communication according to another embodiment.

Referring to FIG. 2A, the electronic device 101 may include a wireless communication module 192 that includes a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244. The electronic device can include a third antenna module 246 that includes an antenna 248. The electronic device 101 may further include a processor 120 and a memory 130. The network 199 may include a first communication network, such as a first cellular network 292 and a second communication network, such as second cellular network 294. According to an embodiment, the electronic device 101 may further include at least one component among the components of FIG. 1, and the network 199 may further include at least one other network. According to an embodiment, the first communication processor (CP) 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first CP 212 may establish a communication channel on a band that is to be used for wireless communication with the first cellular network 292 or may support legacy network communication via the established communication channel. According to an embodiment, the first cellular network may 292 may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214.

For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an US-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first CP 212 and the second CP 214 may be implemented in a single chip or a single package. According to an embodiment, the first CP 212 or the second CP 214, along with the processor 120, an assistance processor 123, or communication module 190, may be formed in a single chip or single package. For example, as shown in FIG. 2B, an integrated communication processor 260 may support all of the functions for communication with the first cellular network and the second cellular network.

Upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first CP 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first CP 212 and the second CP 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second CP 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second CP 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second CP 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first CP 212, or the second CP 214).

Although FIGS. 2A and 2B illustrate an example in which the processor 120 is separated from the first communication processor 212, the second communication processor 214, or the integrated communication processor 260, this is merely an example. According to an embodiment, the electronic device 101 may include an integrated system on chip (SoC) that supports all of the functions of the processor 120, the function for the first network communication of the first communication processor 212, and the function for the second network communication of the second communication processor 214. It will be easily appreciated by one of ordinary skill in the art that the operations of the processor 120, the first communication processor 212, or the second communication processor 214 as described herein may be performed by the integrated SoC.

In certain embodiments, while the electronic device 100 is connected to the first cellular network 292, the processor 120 can control the wireless communication module 192 to connect to the second cellular network 294 in response to receiving an add configuration for the second cellular network 294 from the first cellular network 292. The processor can control the display device 160 to display a first indicator indicating that the second cellular network is connected.

When the second cellular network 294 is disconnected, the electronic device 100 may visually display a second indicator indicating that the second communication network is disconnected. However, for example, when a Secondary Cell Group (SCG) reattach of 5G communication occurs at a coverage boundary or due to a network malfunction, it would be desirable to prevent the processor 120 from causing the display device 160 from repeatedly switching between the first indicator and the second indicator. When disconnection of a second communication network is detected, and the first indicator is displayed or not displayed based on various criteria.

Figure 3:
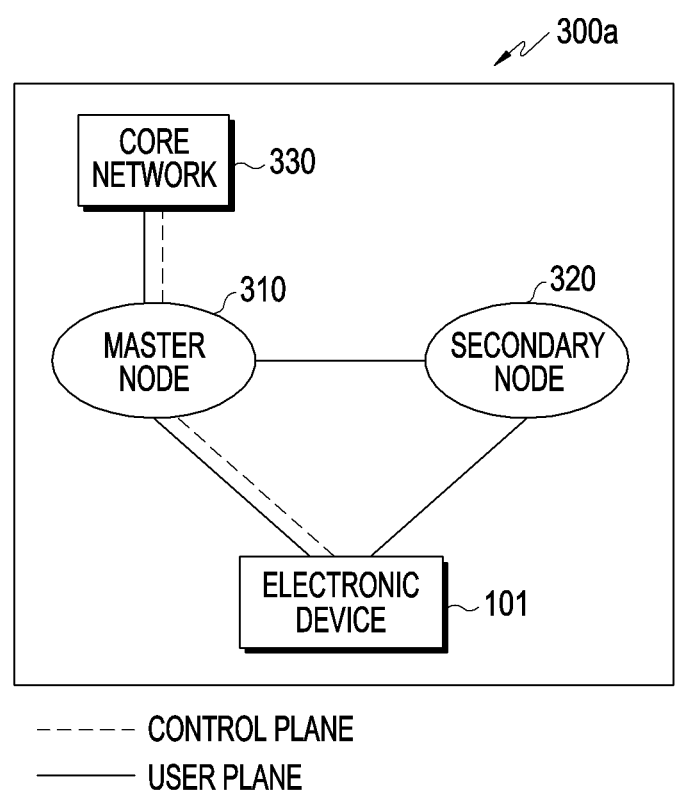
FIG. 3 is a view illustrating wireless communication systems providing a legacy communication network and/or a 5G communication network according to an embodiment.

FIG. 3 is a view illustrating wireless communication systems providing a legacy communication network and/or a 5G communication network according to an embodiment. Referring to FIG. 3, the network environment 300a may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) that manages 4G communication. The 5G network may include, e.g., a new radio (NR) base station (e.g., a gNodeB (gNB)) that supports radio access with the electronic device 101 and a 5th generation core (5GC) that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC).

Referring to FIG. 3, according to an embodiment, the electronic device 101 may transmit or receive at least one of a control message or user data to/from at least part (e.g., the NR base station or 5GC) of the 5G network via at least part (e.g., the LTE base station or EPC) of the legacy network.

According to an embodiment, the network environment 300a may include a network environment that provides wireless communication dual connectivity (DC) to the LTE base station and the NR base station and transmits or receives control messages to/from the electronic device 101 via one core network 230 of the EPC or the 5GC.

According to an embodiment, in the DC environment, one of the LTE base station or the NR base station may operate as a master node (MN) 310, and the other as a secondary node (SN) 320. The MN 310 may be connected with the core network 230 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 340, the SN 320 may include the NR base station, and the core network 330 may include the EPC. For example, control messages may be transmitted/received via the LTE base station and the EPC, and user data may be transmitted/received at least one of the LTE base station or the NR base station.

According to an embodiment, the MN 310 may include the NR base station, the SN 320 may include the LTE base station, and the core network 330 may include the 5GC. For example, control messages may be transmitted/received via the NR base station and the 5GC, and user data may be transmitted/received at least one of the LTE base station or the NR base station.

According to an embodiment, the electronic device 101 may be registered in at least one of the EPC or the 5GC to transmit or receive control messages.

According to an embodiment, the EPC or the 5GC may interwork with each other to manage communication for the electronic device 101. For example, mobility information for the electronic device 101 may be transmitted or received via the interface between the EPC and the 5GC.

As set forth above, dual connectivity via the LTE base station and the NR base station may be referred to as E-UTRA new radio dual connectivity (EN-DC). Besides the EN-DC, the MR DC may have other various applications. For example, a first network and a second network by the MR DC may be both related to LTE communication, and the second network may be a network corresponding to a small cell of a specific frequency. For example, the first network and the second network by the MR DC may be both related to 5G, and the first network may correspond to a frequency band (e.g., below 6) less than 6 GHz, and the second network may correspond to a frequency band (e.g., over 6) not less than 6 GHz. It will be easily appreciated by one of ordinary skill in the art that other various dual-connectivity-applicable network structures may be applied to embodiments of the disclosure.

Figure 4:
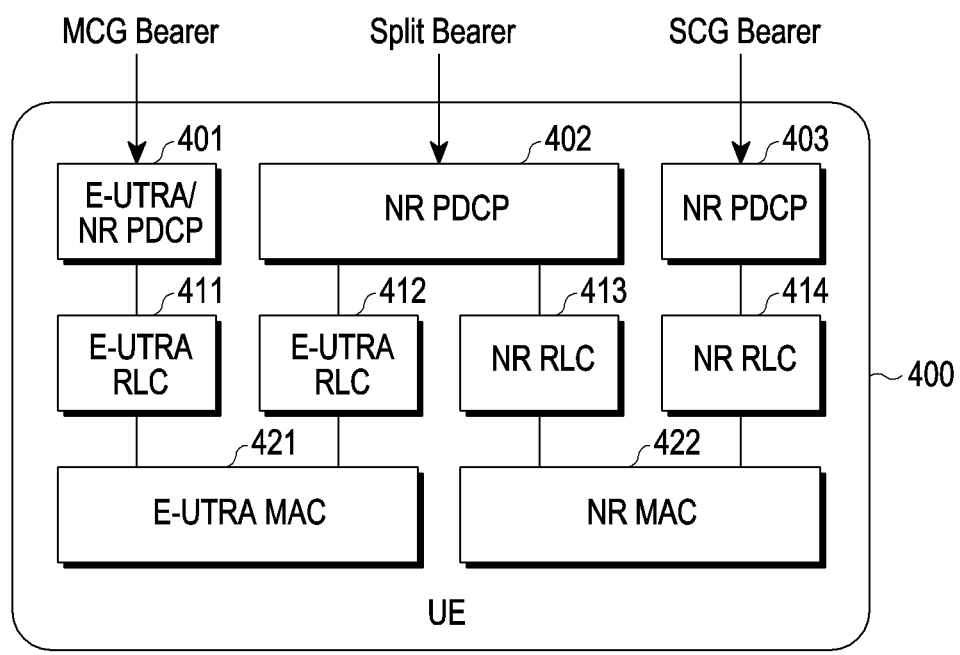
FIG. 4 is a view illustrating a bearer in a UE according to an embodiment.

FIG. 4 is a view illustrating a bearer in a UE according to an embodiment.

Bearers possible in the 5G non-standalone network environment (e.g., the network environment 300a of FIG. 3) may include a master cell group (MCG) bearer, a secondary cell group (SCG) bearer, and a split bearer. An E-UTRA/NR (packet data convergence protocol) PDCP entity 401 and NR PDCP entities 402 and 430 may be configured in a user equipment (UE) 400. E-UTRA radio link control (RLC) entities 411 and 412 and NR RLC entities 413 and 414 may be configured in the UE 400. An E-UTRA MAC entity 421 and an NR MAC entity 422 may be configured in the UE 400. The UE may be a user device capable of communicating with base stations, and the UE may be interchangeably used with the electronic device 101 of FIG. 1. For example, when the UE performs a specific operation according to an embodiment, this may mean that at least one component of the electronic device 101 performs the specific operation.

The MCG may correspond to, e.g., the master node (MN) 310 of FIG. 3, and the SCG may correspond to the secondary node (SN) 320 of FIG. 3. The UE 400, if a node for communication is determined, may configure various entities as shown in FIG. 4 for communication with the determined node (e.g., a base station). The PDCP layer entities 401, 402, and 403 may receive data (e.g., PDCP SDU corresponding to IP packet) and output converted data (e.g., PDCP protocol data unit (PDU)) to which additional information (e.g., header information) has been applied. RLC layer entities 411, 412, 413, and 414 may receive the converted data (e.g., PDCP PDU) from the PDCP layer entities 401, 402, and 403 and output converted data (e.g., RLC PDU) to which additional information (e.g., header information) has been applied. MAC layer entities 421 and 422 may receive the converted data (e.g., RLC PDU) from the RLC layer entities 411, 412, 413, and 414 and output converted data (e.g., MAC PDU) to which additional information (e.g., header information) has been applied and transfer to the physical layer (not shown).

The MCG bearer may be associated with a path (or data) through which data may be transmitted/received only using the entity or resources corresponding to the MN in dual connectivity (DC). The SCG bearer may be associated with a path (or data) through which data may be transmitted/received only using the entity or resources corresponding to the SN in dual connectivity. The split bearer may be associated with a path (or data) through which data may be transmitted/received using the entity or resources corresponding to the MN and the entity or resources corresponding to the SN in dual connectivity. Thus, as shown in FIG. 4, the split bearer may be associated with all of the E-UTRA RLC entity 412 and the NR RLC entity 413 and the E-UTRA MAC entity 421 and NR MAC entity 422 via the NR PDCP entity 402.

Figure 5:
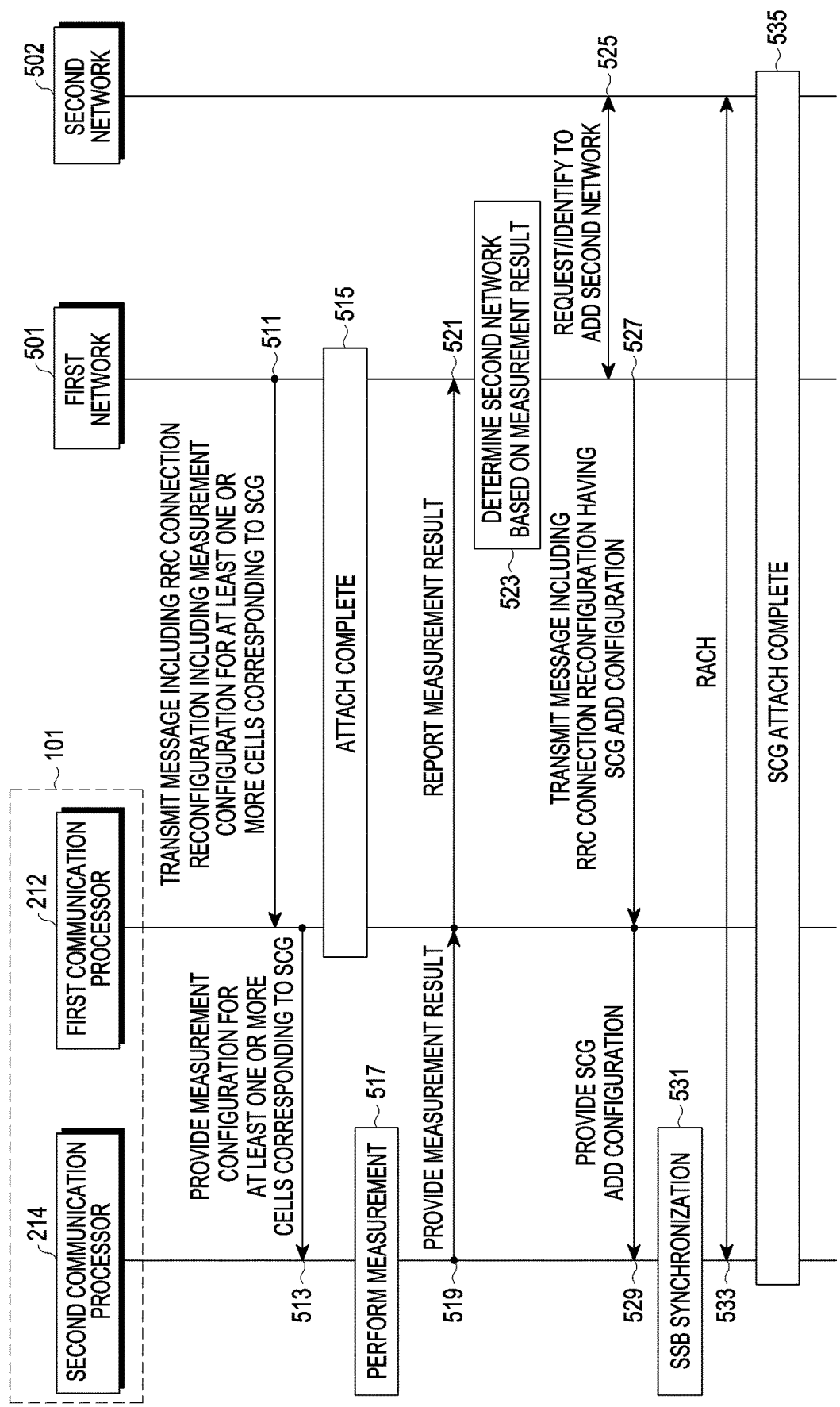
FIG. 5 is a flowchart illustrating a method of operations of an electronic device, a first network, and a second network according to an embodiment.

FIG. 5 is a flowchart illustrating a method of operations of an electronic device, a first network, and a second network according to an embodiment.

According to an embodiment, a first network 501 may transmit a radio resource control (RRC) connection reconfiguration message having an SCG measurement configuration to the electronic device 101 in operation 511. The first communication processor 212 of the electronic device 101 may receive the RRC connection reconfiguration message having the SCG measurement configuration. For example, the electronic device 101 may receive the RRC connection reconfiguration message based on the first network 501 and first network communication. In FIG. 5, the first network communication may correspond to the control plane and user plane, and the first network 501 may be an MN. The second network communication may correspond to the user plane, and the second network 502 may be an SN. Thus, the electronic device 101 may receive the RRC connection reconfiguration message of the SCG measurement configuration, based on the first network communication.

In operation 513, the first communication processor 212 may provide a measurement configuration for at least one or more cells corresponding to the SCG to the second communication processor 214. In operation 515, the first communication processor 212 may complete the establishment of an RRC connection with the first network 501, e.g., an attach for the first network 501. In operation 517, the second communication processor 214 may perform SCG measurement based on the received SCG measurement configuration. Here, the SCG measurement may mean measuring a parameter (e.g., reference signal received power (RSRP), reference signal received quality (RSRQ), received signal strength indicator (RSSI), or signal-to-noise ratio (SNR)) of the communication signal of the neighbor cell corresponding to the SCG. The RRC connection reconfiguration message may include a report condition. For example, the RRC connection reconfiguration message may include an NR-B1 event as the report condition.

The entering condition and leaving condition according to the NR-B1 event which is an example of the reporting condition may be as shown in Table 1 below.

TABLE 1

Inequality B1-1 (Entering condition)
Mn + Ofn − Hys > Thresh
Inequality B1-2 (Leaving condition)
Mn + Ofn + Hys < Thresh
−Hys : reflect the hysteresis value
−Ofn : reflect freq.-specific offset In Table 1, Mn may denote the result of measurement on the inter-RAT neighbor cell, and no offset may have been applied to this value. In the disclosure, measurement on the neighbor cell may mean measuring the characteristics of the signal transmitted from the neighbor cell. Mn may be expressed in dBm or dB, relying on the measurement quantity of the inter-RAT neighbor cell. Ofn may be the frequency-specific offset of the inter-RAT neighbor cell. Hys may be the hysteresis parameter for B1 event. Thresh may be the threshold parameter for B1 event. Ofn and Hys may be expressed in dB or dBm, and Hys may be represented in the same unit as Mn. For example, when Mn+Ofn−Hys exceeds Thresh, the electronic device 101 may transmit the result of measurement on the cell to the MN (e.g., the first base station) and may perform at least one additional operation for MR DC. Further, when Mn+Ofn+Hys is less than Thresh, the electronic device 101 may stop transmission of the result of measurement on the cell.

According to an embodiment, in operation 519, the second communication processor 214 may provide the measurement result to the first communication processor 212. In operation 521, the first communication processor 212 may report the measurement result to the first network 501. The electronic device 101 may report the measurement result when the measurement result meets a report condition (e.g., NR-B1 event). In operation 523, the first network 501 may determine that the second network 502 is the SN based on the measurement result. In operation 525, the first network 501 may transmit/receive an addition request and an acknowledgement to/from the second network 502. In operation 527, the first network 501 may transmit an RRC connection reconfiguration message having the SCG add configuration to the first communication processor 212. In operation 529, the first communication processor 212 may provide the SCG add configuration to the second communication processor 214. In operation 531, the second communication processor 214 may perform synchronization signal block (SSB) synchronization. In operation 533, the second communication processor 214 may perform a contention-free random access channel (CF RACH) procedure with the second network 502. In operation 535, the second communication processor 214 may complete an SCG attach with the second network 502. After the SCG attach is complete, the electronic device 101 may transmit/receive user data based on at least one of first network communication or second network communication.

Although FIG. 5 illustrates that the operations of the first communication processor 212 and the second communication processor 214 are separated from each other, as described above in connection with FIG. 2B, the electronic device 101 may be implemented to include an integrated system-on-chip (SoC) or the integrated communication processor 260 supporting both the first network communication and the second network communication. Also in this case, the integrated communication processor 260 or the integrated SoC may perform the operations of the first communication processor 212 and the second communication processor 214 of FIG. 5. Data transmission/reception between the first communication processor 212 and the second communication processor 214 may be appreciated as data generation in the integrated communication processor 260 or integrated SoC or data transmission/reception between the blocks in the integrated communication processor 260 or integrated SoC. It will be easily appreciated by one of ordinary skill in the art that the description of the integrated communication processor 260 or integrated SoC is applicable to all of the operations of the first communication processor 212 and the second communication processor 214 in the disclosure.

Figure 6A:
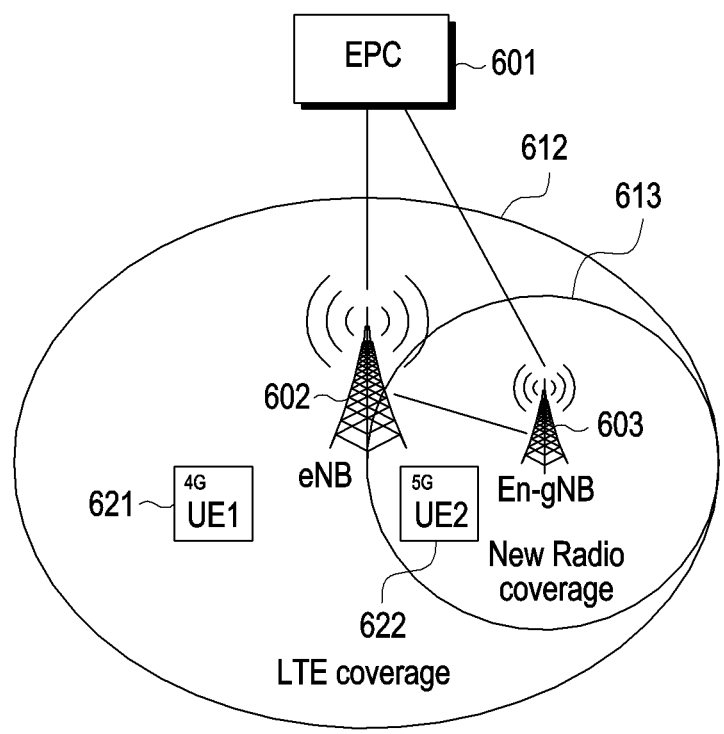
FIG. 6A is a view illustrating a UE in an environment where a plurality of network communications are supported according to an embodiment.
Figure 6B:
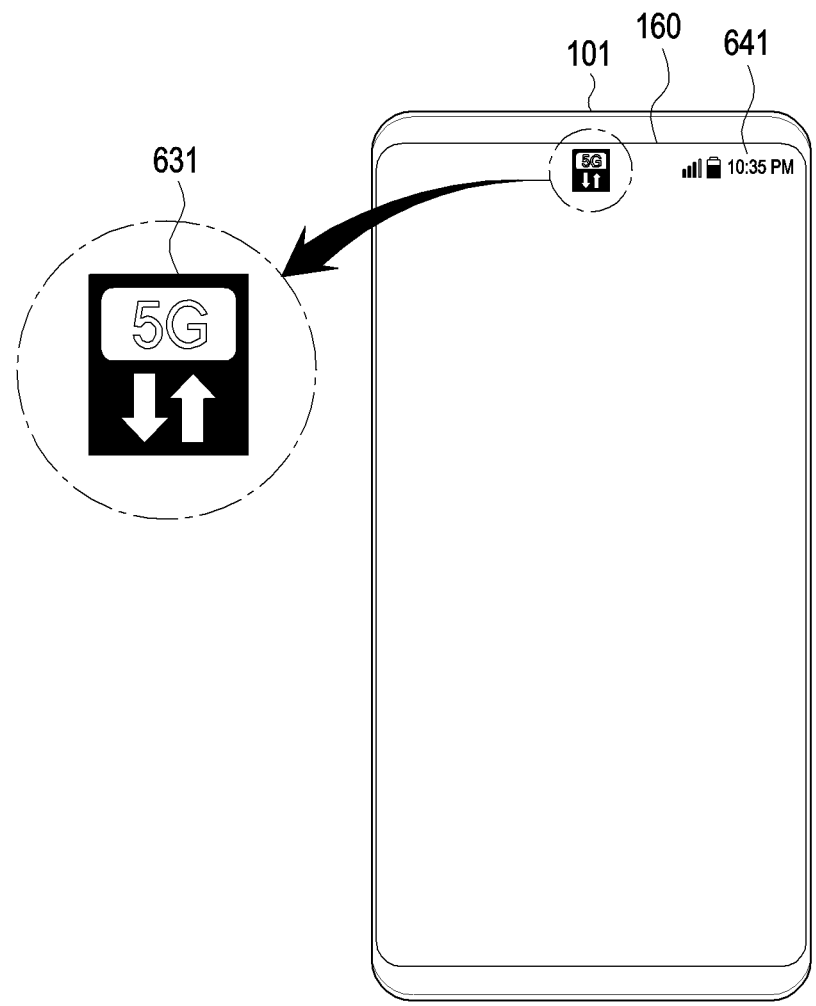
FIG. 6B is a view illustrating an electronic device according to an embodiment.

FIGS. 6A-6E illustrate user equipment in DC connectivity environment. In FIG. 6A, user equipment 622 can measure a parameter of a signal from En-gNB 603 that supports 5G Communication, which can be a second communication network and determine that the parameter meets a predetermined condition. The UE 622 can report the foregoing to eNB 602 that supports LTE communication (a first communication network). In response, the eNB 602 can transmit a reconfiguration message having an SCG add configuration to UE 622. The UE 622 then establishes a connection with En-gNB 603. Turning to FIG. 6B, the user equipment can display an indicator 631 indicating connection to a 5G communication network.

Figure 6C:
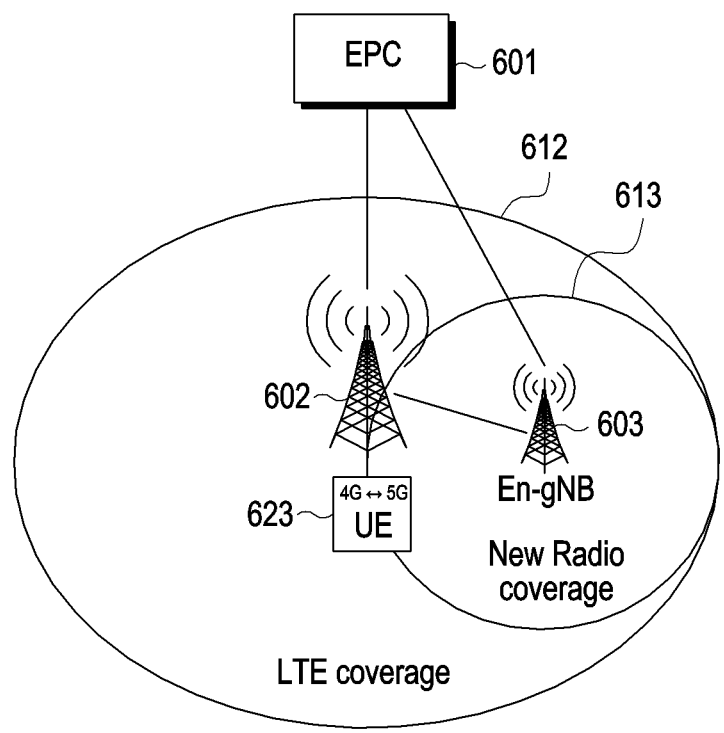
FIG. 6C is a view illustrating a UE in an environment where a plurality of network communications are supported according to an embodiment.
Figure 8:
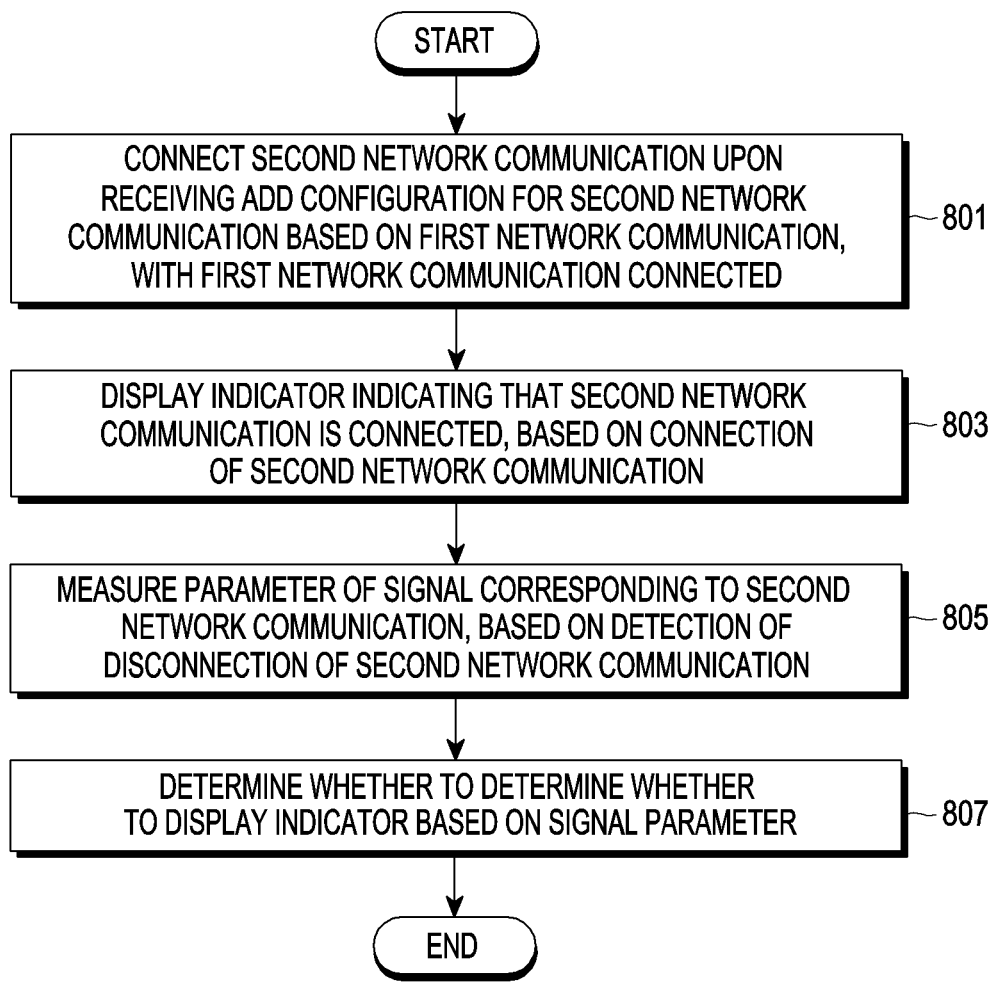
FIG. 8 is a flowchart illustrating a method for operating an electronic device according to an embodiment.
Figure 9:
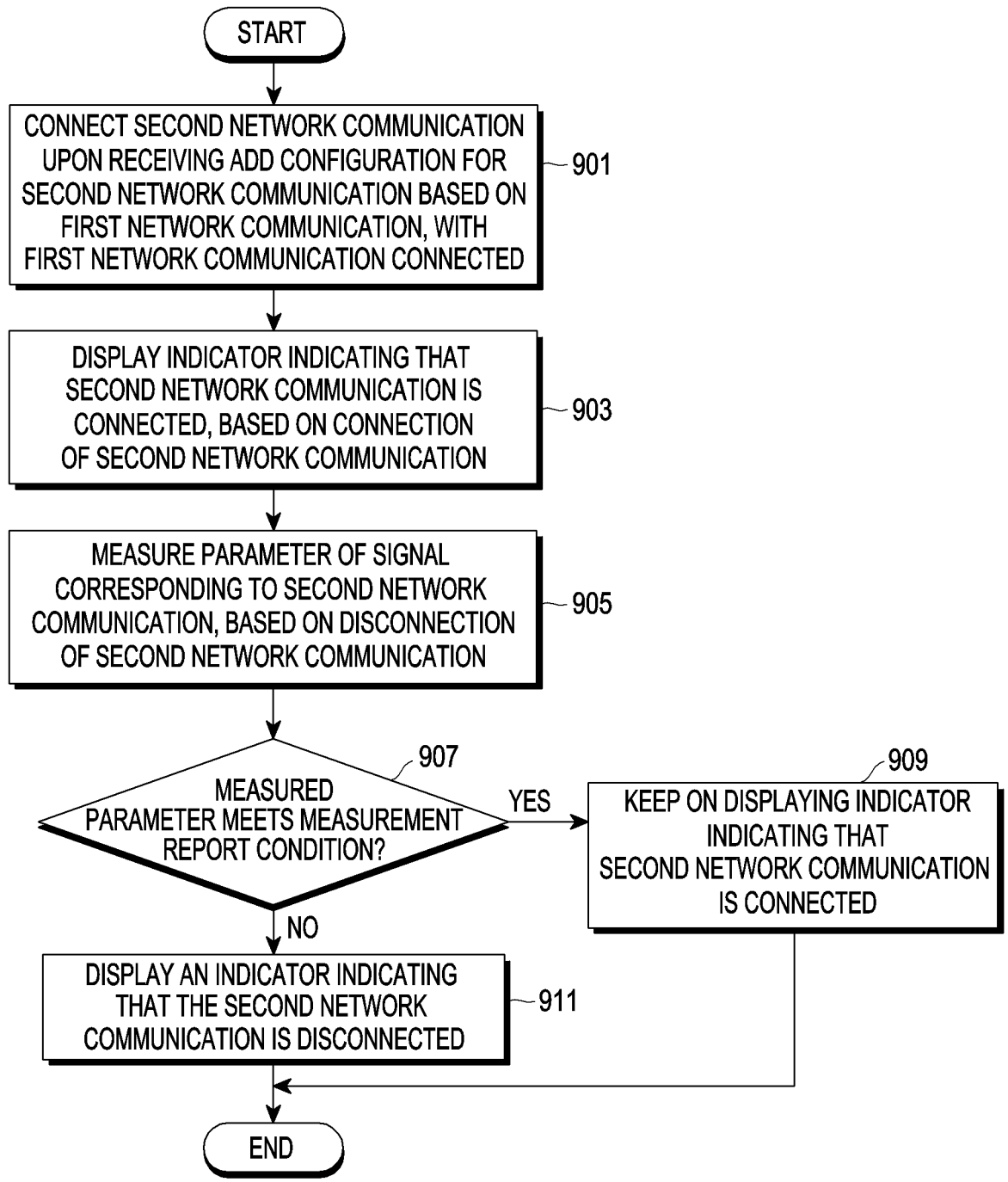
FIG. 9 is a flowchart illustrating a method for operating an electronic device according to an embodiment.

However, as in FIG. 6C, when user equipment 623 is near a border of the radio coverage of En-gNB 603, intermittent connection/disconnection with the 5G Communication Network occurs. Constantly switching between the first indicator 631, and a second indicator 632 (see FIG. 6D) indicating only connection to LTE can give the user the impression of a poor communication state. According to certain embodiments, the UE 623 measures a parameter of a signal corresponding to the second communication network (see FIG. 8), and determines whether or not to continue displaying the indicator based on the parameter. In FIG. 9, either the indicator 632 or 633 is displayed based on whether the parameter meets a condition.

FIG. 6A is a view illustrating a UE in an environment where a plurality of communication networks are supported according to an embodiment.

Referring to FIG. 6A, an eNB 602 may support LTE communication and may connect to an evolved packet core (EPC) 601. An En-gNB 603 may support 5G communication and may connect to the EPC 601. For example, the environment of FIG. 6A may have the NSA option 3 structure as shown in FIG. 3. The eNB 602 may operate as, e.g., the MN 310 of FIG. 3. The En-gNB 603 may operate as, e.g., the SN 320 of FIG. 3. The eNB 602 may transmit/receive control messages and/or user messages to/from the EPC 601. The En-gNB 603 may transmit/receive user messages to/from the EPC 601. The eNB 602 and the En-gNB 603 may be connected with each other via a network interface to transmit or receive messages related to radio resource (e.g., communication channel) management therebetween. A first UE 621 (e.g., the electronic device 101 or the UE 400) may connect LTE communication via the eNB 602 within the coverage of the eNB 602. A second UE 622 (e.g., the electronic device 101 or the UE 400) may connect 5G communication via the En-gNB 603 within the coverage of the En-gNB 603. As described above in connection with FIG. 5, the second UE 622 may measure the parameter (e.g., RSRP and RSRQ) of the signal from the En-gNB 603, with an RRC connection made based on the eNB 602. The second UE 622 may identify that the parameter of the signal meets a predetermined condition (e.g., NR-B1 event) and report measurement information to the eNB 602. Upon receiving the RRC connection reconfiguration message having an SCG add configuration (e.g., an SCG add configuration for the En-gNB 603) from the eNB 602, the second UE 622 may perform an RACH procedure with the En-gNB 603. Accordingly, the second UE 622 may perform 5G communication connection and provide an indicator that may indicate that 5G communication is connected. FIG. 6B is a view illustrating an electronic device according to an embodiment. As shown in FIG. 6B, the electronic device 101 may display a first indicator 631 indicating that 5G communication is connected, on the display device 160. The electronic device 101 may display the current time 641.

Figure 6D:
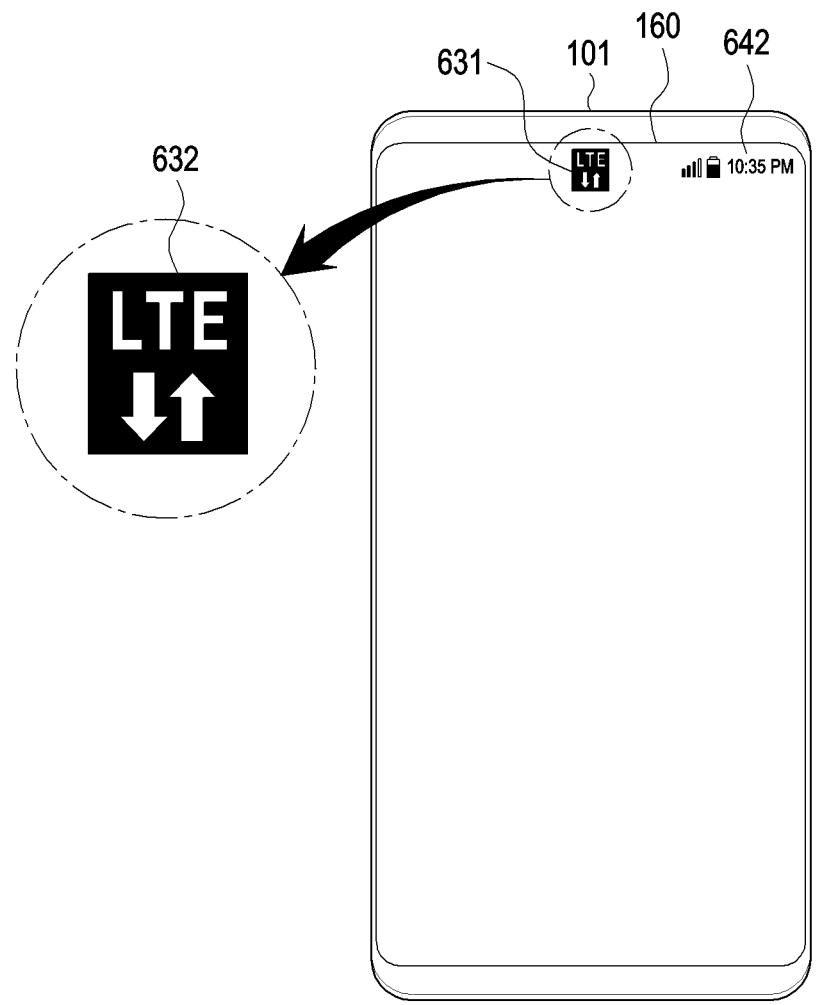
FIG. 6D is a view illustrating an electronic device according to an embodiment.
Figure 6E:
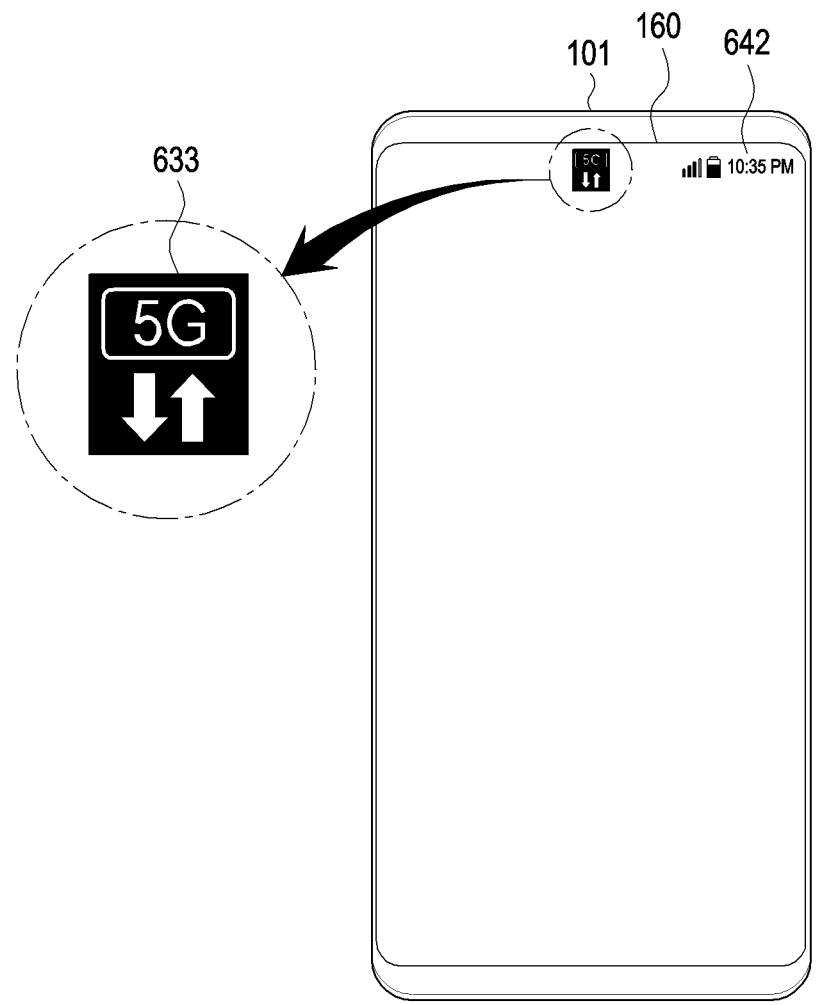
FIG. 6E is a view illustrating an electronic device according to an embodiment.

FIG. 6C is a view illustrating a UE in an environment where a plurality of communication networks are supported according to an embodiment. Referring to FIG. 6C, a UE 623 (e.g., the electronic device 101 or the UE 400) may be located near the boundary of the coverage 613 of the En-gNB 603. The UE 623 may detect an SCG failure or an SCG release. Upon identifying the SCG failure or SCG release, e.g., disconnection of 5G communication, the UE 623 may display a second indicator 632 indicating that 5G communication is disconnected as shown in FIG. 6D. According to an embodiment, the second indicator 632 may be implemented to having a shape indicating that first communication network (e.g., LTE communication) is connected. The electronic device 101 may display the current time 642. Upon identifying the SCG failure or SCG release, e.g., disconnection of 5G communication, the UE 101 may display a third indicator 633 as shown in FIG. 6E. The third indicator 633 may be implemented to have a shape indicating that second communication network, e.g., 5G communication, is disconnected. For example, the electronic device 101 may identify the capability of the eNB 602 and, when the eNB 602 supports EN-DC, display the third indicator 633 indicating that 5G communication is possible but is disconnected. When the eNB 602 does not support EN-DC, the electronic device 101 may display the second indicator 632 indicating that 5G communication is disconnected. For example, the electronic device 101 may identify whether the eNB 602 supports EN-DC based on the value of upperlayerindication-r15 included in the SIB2 from the eNB 602. However, it will be easily appreciated by one of ordinary skill in the art that the second indicator 632 or the third indicator 633 is merely an example and any indicator may be used without limitations as long as it may indicate disconnection of the communication corresponding to the SCG.

For example, the UE 623 may perform the SCG add procedure again, thereby performing 5G communication connection. In this case, the UE 623 may again display the first indicator 631 as shown in FIG. 6B. When the UE 623 is located near the boundary of the coverage 613, the UE 623 may continuously switch from the first indicator 631 indicating that 5G communication is connected to the second indicator 632 (or third indicator 633) indicating that 5G communication is disconnected (or from the second indicator (or third indicator) to the first indicator). Even when the UE 623 frequently performs an intra LTE handover, the above-described operation may have a chance of being repeatedly performed. The user may have a chance of recognizing the frequent switch between the indicators as a poor communication state. Further, the UE 623 may unnecessarily waste resources for changing the display of the indicator. When the processor 120 (e.g., an application processor (AP)) is implemented independently from the communication processor, and the processor 120 is in a sleep state (or inactive state), the processor 120 may unnecessarily wake up for changing the display of the indicator and thus may consume more battery.

Figure 7:
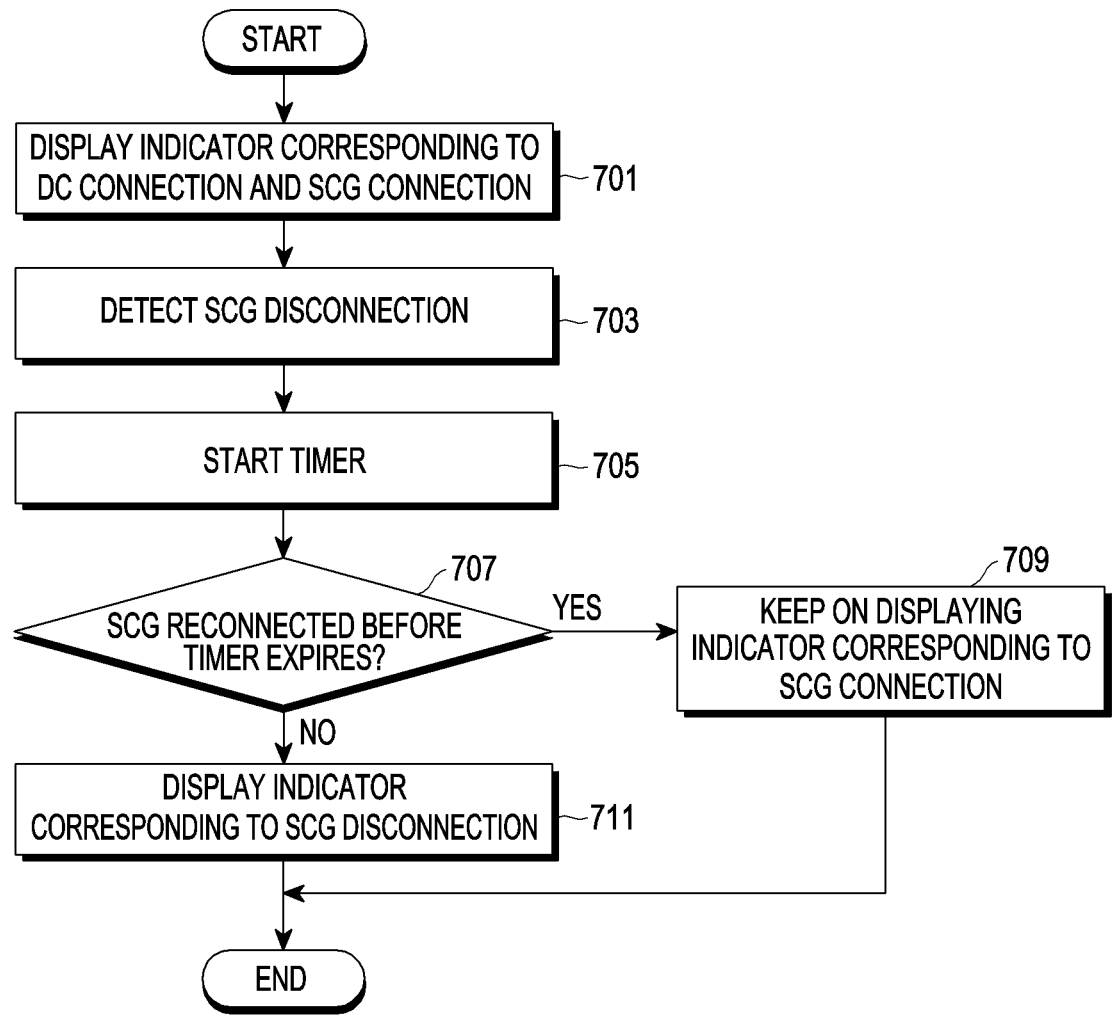
FIG. 7 is a flowchart illustrating a method of operation of an electronic device.

FIG. 7 is a flowchart illustrating a method of operation of an electronic device.

In operation 701, the electronic device 101 may perform dual connectivity, e.g., connecting the communication network corresponding to the MCG and the communication network corresponding to the SCG, and display the indicator corresponding to the connection of the communication network corresponding to the SCG. For example, the electronic device 101 may display the indicator (e.g., the first indicator 631) corresponding to the connection of 5G communication as shown in FIG. 6B. In operation 703, the electronic device 101 may detect a disconnection of the communication network corresponding to the SCG. For example, the electronic device 101 may detect an SCG failure or may receive an RRC connection reconfiguration message indicating an SCG release from the network corresponding to the MCG. In operation 705, the electronic device 101 may start the timer based on the disconnection of the communication network corresponding to the SCG.

In operation 707, the electronic device 101 may identify whether the communication network corresponding to the SCG is reconnected before the timer expires (e.g., within 15 seconds). For example, upon identifying that the SCG bearer notification status is 0, the electronic device 101 may initiate the timer. When the SCG bearer notification status is identified as 0 before the timer expires, the electronic device 101 may determine that the communication network corresponding to the SCG is not reconnected. Upon identifying that the communication network corresponding to the SCG is reconnected before the timer expires (yes in 707), the electronic device 101 may keep on displaying the indicator (e.g., the first indicator 631) corresponding to the SCG communication network connection in operation 709. Upon identifying that the communication network corresponding to the SCG is not reconnected before the timer expires (no in 707), the electronic device 101 may display the indicator (e.g., the second indicator 632 or third indicator 633) corresponding to the release of SCG communication network connection in operation 711. Since the indicator corresponding to the SCG communication network connection may be maintained until before the timer expires, unnecessary resource consumption for changing indicators may be reduced. In certain embodiments, displaying or not displaying indicator 633 is based on a signal parameter of the second communication network. FIG. 8 is a flowchart illustrating a method for operating an electronic device according to an embodiment.

According to an embodiment, in operation 801, the electronic device 101 may perform connection of second communication network upon receiving an add configuration (e.g., an RRC connection reconfiguration message having an SCG add configuration) for second communication network, based on first communication network, with the first communication network connected. For example, the electronic device 101 may form an RRC connection for the first communication network (e.g., LTE communication). The electronic device 101 may measure the parameter (e.g., RSRP and RSRQ) of the signal from at least one cell corresponding to second communication network. Upon identifying that the measurement result meets a report condition (e.g., NR-B1 condition), the electronic device 101 may report the measurement result to the first network 501. The first network 501 may determine a second network 502 to be added to the SCG, send a request for SCG addition to the second network 502, and receive an acknowledgement for the SCG add request from the second network 502. The second network 502 may transmit an RRC connection reconfiguration message having an SCG add configuration to the electronic device 101. The electronic device 101 may perform a random access procedure for the second network 502 and SSB synchronization, based on reception of the RRC connection reconfiguration message having the SCG add configuration. As the random access procedure is performed, the electronic device 101 may connect second communication network with the second network 502.

According to an embodiment, in operation 803, the electronic device 101 may display an indicator indicating that second communication network is connected, based on the connection of the second communication network. For example, the electronic device 101 may display a first indicator 631 as shown in FIG. 6B. For example, at least one of the first communication processor 212, the second communication processor 214, or the integrated communication processor 260 may provide information indicating that the second communication network is connected to the processor 120. The information provided to the processor 120 may be represented in the form of a flag, but is not limited thereto. The processor 120 may control the display device 160 to display the indicator (e.g., the first indicator 631) indicating that the second communication network is connected, based on the received information indicating that the second communication network is connected. If the indicator (e.g., the second indicator 632 or the third indicator 633) indicating that the second communication network is disconnected is already being displayed, the processor 120 may control the display device 160 to, instead of the indicator, display an indicator (e.g., the first indicator 631) indicating that the second communication network is connected.

According to an embodiment, in operation 805, the electronic device 101 may measure the parameter of the signal corresponding to the second communication network based on detection of the disconnection of the second communication network. In operation 807, the electronic device 101 may determine whether to display the indicator based on the parameter of the signal. For example, the electronic device 101 may detect an SCG failure or may receive SCG release information from a network (e.g., the first network 501). The electronic device 101 may measure the parameter of the signal corresponding to the second communication network based on the detection of the disconnection of the second communication network.

As described above, upon identifying that the report condition is met, the electronic device 101 may keep on displaying the indicator indicating that the communication network corresponding to the SCG is connected. If performing measurement reporting, the electronic device 101 may keep on displaying the indicator indicating the connection of the communication network corresponding to the SCG. It will be easily appreciated by one of ordinary skill in the art that the configuration of keeping on displaying the indicator (e.g., the first indicator 631) upon identifying that the report condition is met may be replaced with the configuration of keeping on displaying the indicator (e.g., the first indicator 631) upon identifying that measurement reporting is performed.

According to an embodiment, the electronic device 101 may measure the parameter of the signal at the frequency (or band) corresponding to a neighbor cell, as stored, but the frequency (or band) for measuring the parameter of the signal is not limited thereto. The electronic device 101 may measure the parameter of the signal based on the system information received from the first network 501 or may measure the parameter of the signal based on a connection history, but information used for measuring the parameter of the signal is not limited thereto. For example, the electronic device 101 may determine whether to display the indicator based on whether the parameter of the signal meets the report condition. Here, the report condition may be, e.g., the report condition (e.g., NR-B1 event) received from the first network 501, but the report condition is not limited thereto.

As an example, at least one of the first communication processor 212, the second communication processor 214, or the integrated communication processor 260 may provide information indicating whether the report condition is met to the processor 120. In this case, the processor 120 may determine whether to display the indicator based on the information indicating whether the report condition is met. As another example, at least one of the first communication processor 212, the second communication processor 214, or the integrated communication processor 260 may provide, to the processor 120, any one of the information indicating that the second communication network is connected or the information indicating that the second communication network is disconnected, based on whether the parameter of the signal meets the report condition. In this case, the processor 120 may be configured to display the indicator based on the received information indicating that the second communication network is connected or the received information indicating that the second communication network is disconnected.

For example, the electronic device 101 may receive at least one of first band (e.g., n71 band), measurement period, measurement time, subcarrier spacing, RSRP threshold (e.g., threshers-Index-r15), or RSRQ threshold offset frequency information. The RSRP threshold may be set to a value not less than −139 dBm and not more than −138 dBm, but this is merely an example value. When the report condition is met, the electronic device 101 may report a measurement object including cell information (e.g., PCI) and the measurement values of RSRP and RSRQ to the first network 501.

According to certain embodiments, the indicator 631 is kept or replaced with indicator 632 based on whether a parameter of a signal corresponding to the second communication network meets a measurement report condition.

FIG. 9 is a flowchart illustrating a method for operating an electronic device according to an embodiment. Operations which have already been described are described briefly below.

According to an embodiment, in operation 901, the electronic device 101 may perform connection of second communication network upon receiving an add configuration for second communication network, based on first communication network, with the first communication network connected. In operation 903, the electronic device 101 may display an indicator indicating that second communication network is connected, based on the connection of the second communication network. In operation 905, the electronic device 101 may measure the parameter of the signal corresponding to the second communication network based on the detection of the disconnection of the second communication network. For example, the electronic device 101 may detect an SCG failure or may receive a message including an SCG release from a network (e.g., the first network 501).

According to an embodiment, in operation 907, the electronic device 101 may determine whether the measured parameter meets a measurement report condition. Here, the report condition may be, e.g., the report condition (e.g., NR-B1 event) received from the first network 501, but the report condition is not limited thereto. Upon identifying that the measured parameter meets the measurement report condition (yes in 907), the electronic device 101 may keep on displaying the indicator (e.g., the first indicator 631) indicating that the second communication network is connected in operation 909. Upon identifying that the measured parameter does not meet the measurement report condition (no in 907), the electronic device 101 may display an indicator (e.g., the second indicator 632 or the third indicator 633) indicating that the second communication network is disconnected in operation 911. As an example, at least one of the first communication processor 212, the second communication processor 214, or the integrated communication processor 260 may determine whether the measured parameter meets the measurement report condition. At least one of the first communication processor 212, the second communication processor 214, or the integrated communication processor 260 may provide information indicating whether the measurement report condition is met to the processor 120. Based on the received information, the processor 120 may control the display device 160 to display any one of the indicator (e.g., the first indicator 631) indicating that the second communication network is connected or the indicator (e.g., the second indicator 632 or the third indicator 633) indicating that the second communication network is disconnected. At least one of the first communication processor 212, the second communication processor 214, or the integrated communication processor 260 may perform measurement reporting (MR) and then provide information indicating that measurement reporting has been performed to the processor 120. The processor 120 may be configured to keep on displaying the first indicator 631 based on the information indicating that measurement reporting has been performed. As another example, at least one of the first communication processor 212, the second communication processor 214, or the integrated communication processor 260 may determine whether the measured parameter meets the measurement report condition. At least one of the first communication processor 212, the second communication processor 214, or the integrated communication processor 260 may provide the information indicating whether the second communication network is connected depending on whether the measurement report condition is met to the processor 120. Based on the received information, the processor 120 may control the display device 160 to display any one of the indicator (e.g., the first indicator 631) indicating that the second communication network is connected or the indicator (e.g., the second indicator 632 or the third indicator 633) indicating that the second communication network is disconnected.

Figure 10:
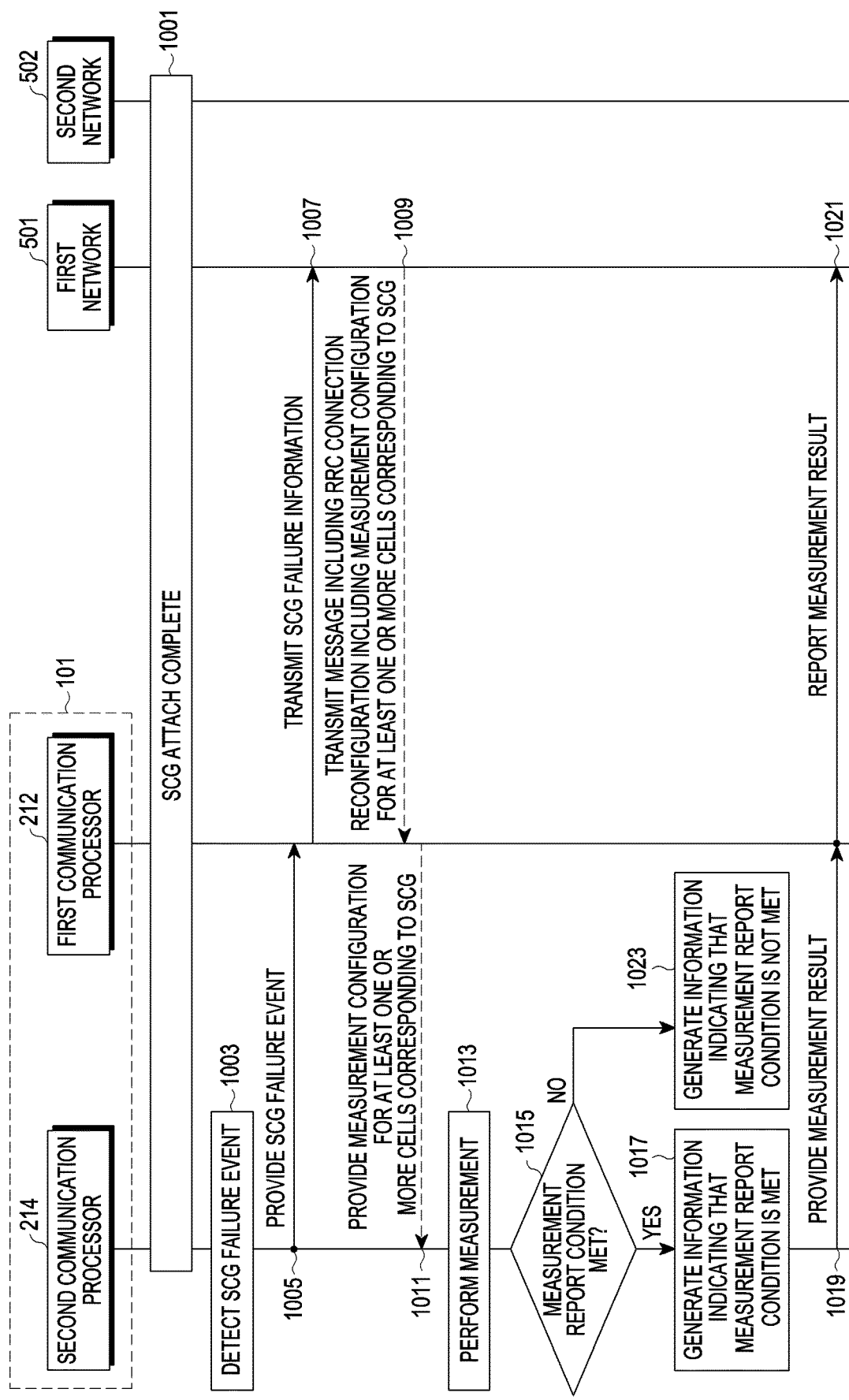
FIG. 10 is a flowchart illustrating a method of operations of an electronic device, a first network, and a second network according to an embodiment.

FIG. 10 is a flowchart illustrating a method of operations of an electronic device, a first network, and a second network according to an embodiment.

According to an embodiment, in operation 1001, the electronic device 101 may complete an SCG attach for the second network 502. For example, the electronic device 101 may receive an RRC connection reconfiguration message having an SCG add configuration from the first network 501. The electronic device 101 may perform a random access procedure for the second network 502 and SSB synchronization, based on reception of the RRC connection reconfiguration message having the SCG add configuration.

According to an embodiment, the second communication processor 214 may detect an SCG failure event in operation 1003. For example, the electronic device 101 may detect any one of t310 timer expiry (t310-expiry), synchronization reconfiguration failure (synchReconfigFailure), random access problem (randomAccessProblem), RLC-maximum number retransmission (rlc-MaxNumRetx), SRB3-integrity failure (srb3-IntegrityFailure), or SCG-reconfiguration failure (scg-reconfigFailure). In operation 1005, the second communication processor 214 may provide an SCG failure event to the first communication processor 212. In operation 1007, the first communication processor 212 may transmit SCG failure information to the first network 501. For example, the electronic device 101 may receive an RRC connection reconfiguration message including a measurement configuration for at least one or more cells corresponding to the SCG in operation 1009. In operation 1011, the first communication processor 212 may provide the measurement configuration for at least one or more cells corresponding to the SCG to the second communication processor 214. In operation 1013, the second communication processor 214 may perform measurement based on the measurement configuration. In some cases, operations 1009 and 1011 may be omitted. When operations 1009 and 1011 are omitted, the second communication processor 214 may perform measurement, in operation 1013, using the SCG measurement configuration received before the SCG attach is complete.

According to an embodiment, the second communication processor 214 may determine whether the measurement report condition is met in operation 1015. Upon identifying that the measurement report condition is met (yes in 1015), the second communication processor 214 may generate information indicating that the measurement report condition is met in operation 1017. The information generated by the second communication processor 214 may be provided to the processor 120. Information indicating that the second communication network is connected may be provided to the processor 120 according to the information generated by the second communication processor 214. The processor 120 may keep on displaying the indicator (e.g., the first indicator 631) indicating that the second communication network is connected, based on the information indicating that the measurement report condition is met or the information indicating that the second communication network is connected. In operation 1019, the second communication processor 214 may provide the measurement result to the first communication processor 212. In operation 1021, the first communication processor 212 may report the measurement result to the first network 501. Thereafter, as in operations 523 to 535 of FIG. 5, the electronic device 101 may be reattached to the second network 502.

According to an embodiment, upon identifying that the measurement report condition is not met (no in 1015), the second communication processor 214 may generate information indicating that the measurement report condition is not met in operation 1023. The information generated by the second communication processor 214 may be provided to the processor 120. Information indicating that the second communication network is disconnected may be provided to the processor 120 according to the information generated by the second communication processor 214. The processor 120 may display the indicator (e.g., the second indicator 632 or the third indicator 633) indicating that the second communication network is disconnected, based on the information indicating that the measurement report condition is not met or the information indicating that the second communication network is disconnected.

Figure 11:
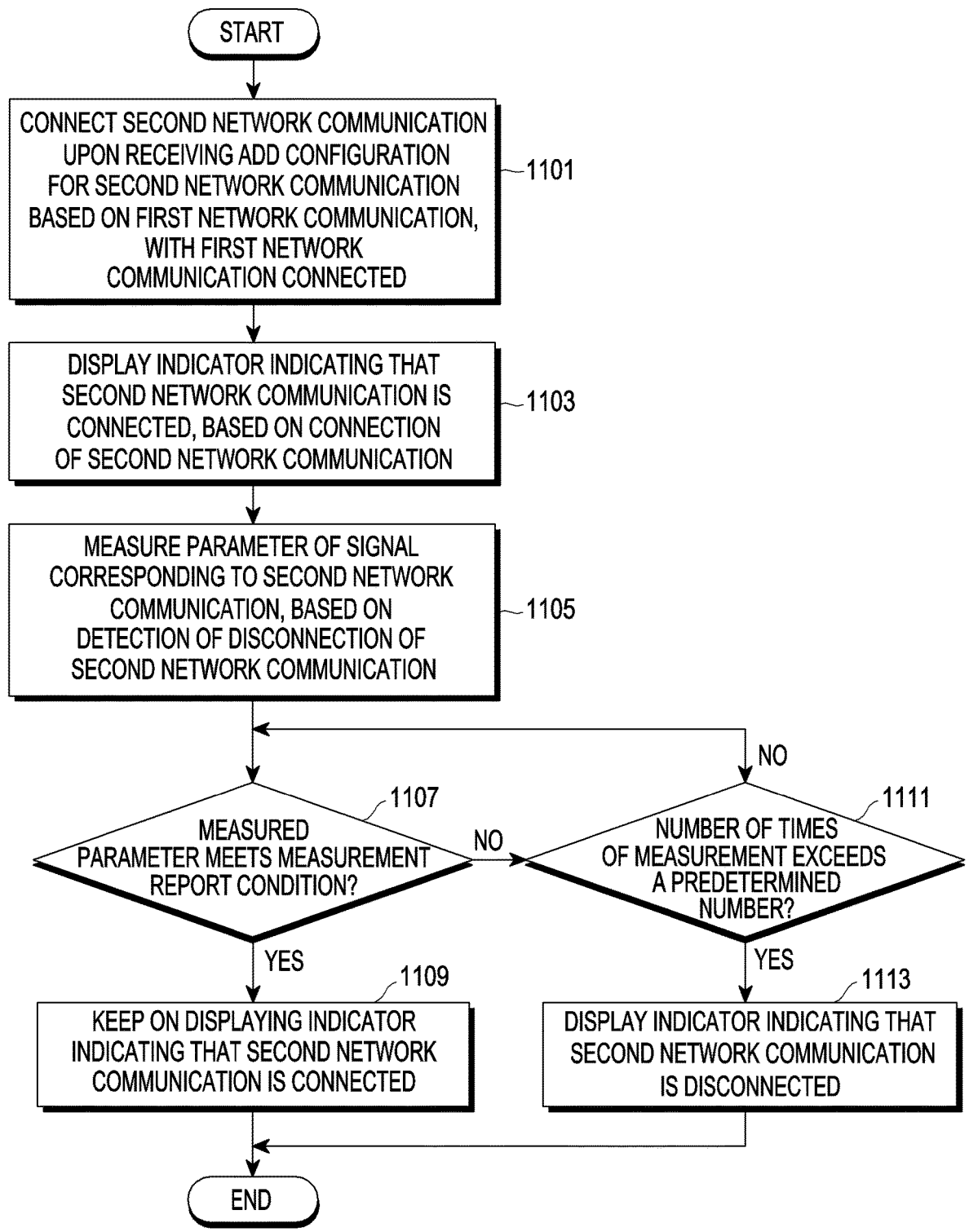
FIG. 11 is a flowchart illustrating a method for operating an electronic device according to an embodiment.

FIG. 11 is a flowchart illustrating a method for operating an electronic device according to an embodiment.

According to an embodiment, in operation 1101, the electronic device 101 may perform connection of second communication network upon receiving an add configuration for second communication network, based on first communication network, with the first communication network connected. For example, the electronic device 101 may receive an RRC connection reconfiguration message of add configuration for the second network 502 (e.g., 5G communication) from the first network 501, with the first communication network (e.g., LTE communication) connected. The electronic device 101 may perform a random access procedure for the second network 502. In operation 1103, the electronic device 101 may display an indicator (e.g., the first indicator 631) indicating that second communication network is connected, based on the connection of the second communication network.

According to an embodiment, in operation 1105, the electronic device 101 may measure the parameter of the signal corresponding to the second communication network based on detection of the disconnection of the second communication network. In operation 1107, the electronic device 101 may determine whether the measured parameter meets the measurement report condition (e.g., NR-B1 event). Upon identifying that the measured parameter meets the measurement report condition (yes in 1107), the electronic device 101 may keep on displaying the indicator (e.g., the first indicator 631) indicating that the second communication network is connected in operation 1109. Upon identifying that the measured parameter does not meet the measurement report condition (no in 1107), the electronic device 101 may identify whether the number of times of measurement exceeds a predetermined number in operation 1111. When the number of times of measurement is not more than the predetermined number (no in 1111), the electronic device 101 may perform measurement again and again determine whether the measurement report condition is met in operation 1107. When the number of times of measurement exceeds the predetermined number (yes in 1111), the electronic device 101 may display an indicator (e.g., the second indicator 632 or the third indicator 633) indicating that the second communication network is disconnected in operation 1113.

Figure 12:
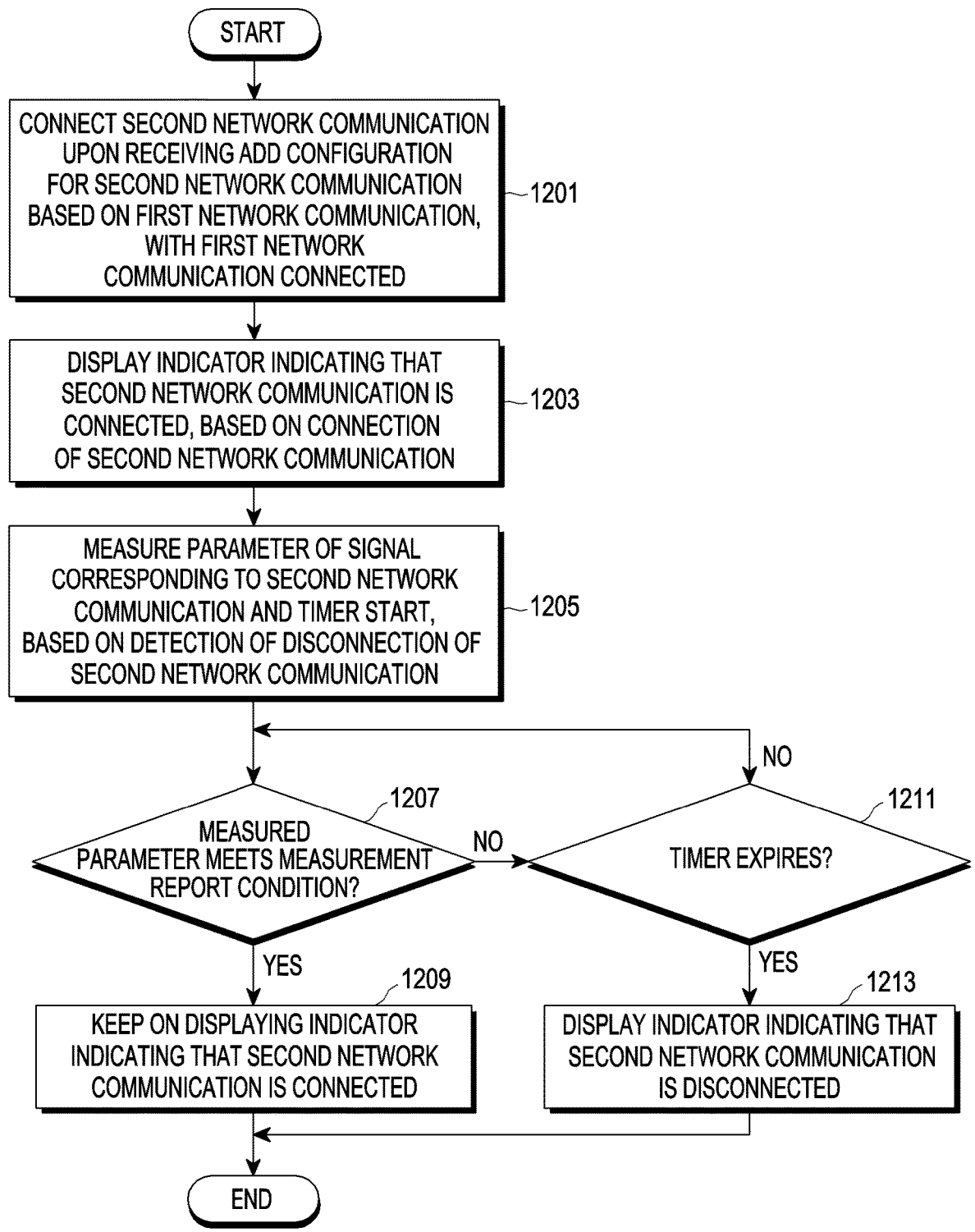
FIG. 12 is a flowchart illustrating a method for operating an electronic device according to an embodiment.

FIG. 12 is a flowchart illustrating a method for operating an electronic device according to an embodiment.

According to an embodiment, in operation 1201, the electronic device 101 may perform connection of second communication network upon receiving an add configuration for second communication network, based on first communication network, with the first communication network connected. For example, the electronic device 101 may receive an RRC connection reconfiguration message of add configuration for the second network 502 (e.g., 5G communication) from the first network 501, with the first communication network (e.g., LTE communication) connected. The electronic device 101 may perform a random access procedure for the second network 502. In operation 1203, the electronic device 101 may display an indicator (e.g., the first indicator 631) indicating that second communication network is connected, based on the connection of the second communication network.

According to an embodiment, in operation 1205, the electronic device 101 may start the timer and measure the parameter of the signal corresponding to the second communication network based on detection of the disconnection of the second communication network. In operation 1207, the electronic device 101 may determine whether the measured parameter meets the measurement report condition (e.g., NR-B1 event). Upon identifying that the measured parameter meets the measurement report condition (yes in 1207), the electronic device 101 may keep on displaying the indicator (e.g., the first indicator 631) indicating that the second communication network is connected in operation 1209. Upon identifying that the measured parameter does not meet the measurement report condition (no in 1207), the electronic device 101 may identify whether the timer expires in operation 1211. When the timer does not expire (no in 1211), the electronic device 101 may perform measurement again and again determine whether the measurement report condition is met in operation 1207. When the timer expires (yes in 1211), the electronic device 101 may display an indicator (e.g., the second indicator 632 or the third indicator 633) indicating that the second communication network is disconnected in operation 1213.

Figure 13:
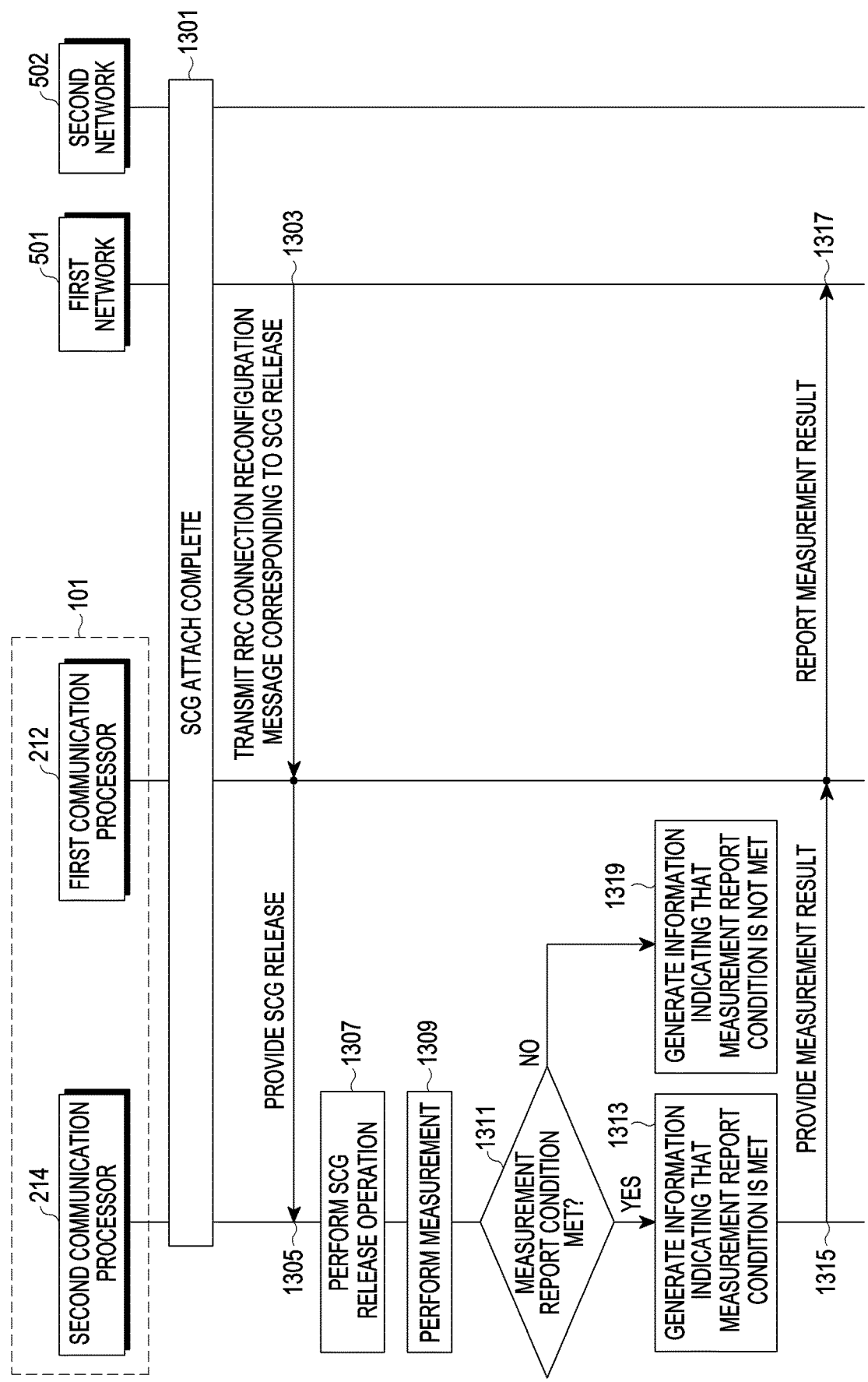
FIG. 13 is a flowchart illustrating a method of operations of an electronic device, a first network, and a second network according to an embodiment.

FIG. 13 is a flowchart illustrating a method for operating an electronic device according to an embodiment.

According to an embodiment, in operation 1301, the electronic device 101 may complete an SCG attach for the second network 502. For example, the electronic device 101 may receive an RRC connection reconfiguration message having an SCG add configuration from the first network 501. The electronic device 101 may perform a random access procedure for the second network 502 and SSB synchronization, based on reception of the RRC connection reconfiguration message having the SCG add configuration.

According to an embodiment, in operation 1303, the first network 501 may transmit an RRC connection reconfiguration message corresponding to an SCG release to the first communication processor 212. In operation 1305, the first communication processor 212 may provide the SCG release to the second communication processor 214. In operation 1307, the second communication processor 214 may perform an SCG release operation. For example, the second communication processor 214 may release the SCG MAC, release the bearer (e.g., signal radio bearer-3 (SRB-3)) which is part of the SCG configuration, release the SCG configuration, stop the T310 timer corresponding to the SpCell, or stop the T304 timer corresponding to the SpCell but the SCG release operations are not limited thereto.

According to an embodiment, in operation 1309, the second communication processor 214 may perform measurement based on the measurement configuration. For example, the second communication processor 214 may perform measurement according to the report condition included in the RRC connection reconfiguration message received before the SCG attach is complete in operation 1301 or the report condition included in the RRC connection reconfiguration message received in operation 1303. According to an embodiment, the second communication processor 214 may determine whether the measurement report condition is met in operation 1311. Upon identifying that the measurement report condition is met (yes in 1311), the second communication processor 214 may generate information indicating that the measurement report condition is met in operation 1313. The information generated by the second communication processor 214 may be provided to the processor 120. Information indicating that the second communication network is connected may be provided to the processor 120 according to the information generated by the second communication processor 214. The processor 120 may keep on displaying the indicator (e.g., the first indicator 631) indicating that the second communication network is connected, based on the information indicating that the measurement report condition is met or the information indicating that the second communication network is connected. In operation 1315, the second communication processor 214 may provide the measurement result to the first communication processor 212. In operation 1317, the first communication processor 212 may report the measurement result to the first network 501. Thereafter, as in operations 523 to 535 of FIG. 5, the electronic device 101 may be reattached to the second network 502.

According to an embodiment, upon identifying that the measurement report condition is not met (no in 1311), the second communication processor 214 may generate information indicating that the measurement report condition is not met in operation 1319. The information generated by the second communication processor 214 may be provided to the processor 120. Information indicating that the second communication network is disconnected may be provided to the processor 120 according to the information generated by the second communication processor 214. The processor 120 may display the indicator (e.g., the second indicator 632 or the third indicator 633) indicating that the second communication network is disconnected, based on the information indicating that the measurement report condition is not met or the information indicating that the second communication network is disconnected.

According to an embodiment, an electronic device, comprises at least one communication circuit configured to connect with a first communication network; a display; and at least one processor, wherein the at least one processor is configured to: control the second communication network to connect with a second communication network in response to receiving an add configuration for the second communication network from the first communication network, while the at least one communication circuit is connected to the first communication network; control the display to display a first indicator indicating that the second communication network is connected, in response to connection with the second communication network; measure a parameter of a signal corresponding to the second communication network, when detecting disconnection of the second communication network; and display or not display the first indicator based on the parameter of the signal.

According to certain embodiments, the at least one processor is configured to, as at least part of displaying or not displaying based on the parameter of the signal: control the display to continue displaying the first indicator when the parameter of the signal meets a report condition; and control the display to not display the first indicator and display a second indicator corresponding to the disconnection of the second communication network when the parameter of the signal does not meet the report condition.

According to certain embodiments, the parameter of the signal includes at least one of a reference signal received power (RSRP) of the signal, reference signal received quality (RSRQ) of the signal, received signal strength indicator (RSSI) of the signal or signal to noise ratio (SNR) of the signal, and wherein the report condition is a B1 event defined in long-term evolution (LTE) or new radio (NR).

According to certain embodiments, the at least one processor is further configured to receive a radio resource control (RRC) connection reconfiguration message for measuring at least one parameter of at least one signal corresponding to the second communication network, and wherein the B1 event is included in one of the RRC connection reconfiguration message or another RRC connection reconfiguration message.

According to certain embodiments, the at least one processor is configured to, as at least part of controlling the display to display the second indicator corresponding to the disconnection of the second communication network: when a network corresponding to the first communication network supports dual connectivity with the second communication network, control the display to display an indicator indicating that the second communication network is possible and is disconnected; and when the network corresponding to the first communication network does not support dual connectivity with the second communication network, control the display to display an indicator indicating that the first communication network is connected.

According to certain embodiments, the at least one processor is configured to, as at least part of determining whether to display the first indicator based on the parameter of the signal: control the display to continue displaying the first indicator, based on the parameter of the signal being reported based on the first communication network as the parameter of the signal meets the report condition; and control the display to display a second indicator corresponding to the disconnection of the second communication network, when the signal being not reported as the parameter of the signal does not meet the report condition.

According to certain embodiments, disconnection of the second communication network is detected when a secondary cell group (SCG) failure event corresponding to the second communication network is detected.

According to certain embodiments, disconnection of the second communication network is detected when an RRC connection reconfiguration message corresponding to an SCG release is received.

According to certain embodiments, measuring the parameter of the signal and displaying or not displaying the first indicator based on the parameter of the signal further comprises: determining whether the parameter meets the report condition a predetermined number of times or at least one or more times within a predetermined time and determining whether to display the first indicator based on a result of the determination.

According to certain embodiments, a method comprises, while connected with a first communication network, connecting with a second communication network in response to receiving an add configuration for the second communication network from the first communication network; displaying a first indicator indicating that the second communication network is connected, in response to connection with the second communication network; measuring a parameter of a signal corresponding to the second communication network, when detecting disconnection of the second communication network; and displaying or not displaying the first indicator based on the parameter of the signal.

According to certain embodiments, displaying or not displaying the first indicator based on the parameter of the signal includes continuing displaying the first indicator when the parameter of the signal meets a report condition; and displaying a second indicator corresponding to the disconnection of the second communication network, when the parameter of the signal does not meet the report condition.

According to certain embodiments, the parameter of the signal includes at least one of a reference signal received power (RSRP) of the signal, reference signal received quality (RSRQ) of the signal, received signal strength indicator (RSSI) of the signal or signal to noise ratio (SNR) of the signal, and wherein the report condition is a B1 event defined in long-term evolution (LTE) or new radio (NR).

According to certain embodiments, the method further comprises receiving a radio resource control (RRC) connection reconfiguration message for measuring at least one parameter of at least one signal corresponding to the second communication network, and wherein the B1 event is included in one of the RRC connection reconfiguration message or another RRC connection reconfiguration message.

According to certain embodiments, controlling the display to display the second indicator corresponding to the disconnection of the second communication network includes: when a network corresponding to the first communication network supports dual connectivity with the second communication network, displaying an indicator indicating that the second communication network is possible and is disconnected; and when the network corresponding to the first communication network does not support dual connectivity with the second communication network, displaying an indicator indicating that the first communication network is connected.

According to certain embodiments, determining whether to display the first indicator based on the parameter of the signal includes: continuing displaying the first indicator, based on the parameter of the signal being reported based on the first communication network as the parameter of the signal meets the report condition; and displaying a second indicator corresponding to the disconnection of the second communication network, when the signal does not meet the report condition.

According to certain embodiments, the method further comprises detecting the disconnection of the second communication network comprises detecting a secondary cell group (SCG) failure event corresponding to the second communication network.

According to certain embodiments, the method further comprises detecting the disconnection of the second communication network further comprises reception of an RRC connection reconfiguration message corresponding to an SCG release.

According to certain embodiments, the method further comprises measuring the parameter of the signal and displaying or not displaying the first indicator based on the parameter of the signal includes: determining whether the parameter meets the report condition a predetermined number of times or at least one or more times within a predetermined time and determining whether to display the first indicator based on a result of the determination.

According to certain embodiments, an electronic device comprises: a display; and at least one processor, wherein the at least one processor is configured to: control the display to display a first indicator indicating that second communication network is connected, while a first communication network and the second communication network are connected; based on a disconnection of the second communication network, control the display to continue displaying the first indicator based on a parameter of a signal, which corresponds to the second communication network, meeting a predetermined condition; and control the display to display a second indicator indicating that the second communication network is disconnected, based on the parameter of the signal, which corresponds to the second communication network, not meeting the predetermined condition.

According to certain embodiments, the at least one processor is configured to determine whether the signal corresponding to the second communication network meets the predetermined condition, depending on whether at least one of an RSRP or RSRQ of the signal corresponding to the second communication network is reported to the first communication network, based on whether at least one of the RSRP or RSRQ meets a report condition included in an RRC connection reconfiguration message received by the electronic device.

The electronic device according to an embodiment may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to an embodiment, there may be provided an electronic device and method for operating the electronic device that may determine whether to display an indicator corresponding to communication network, which belongs to dual connectivity and is disconnected, based on the parameter of a signal corresponding to the communication network when the communication network is disconnected. Thus, it is possible to avoid unnecessary waste of resources for processing indicator switching.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   communication circuitry;
   a display;
   at least one processor; and
   a memory storing instructions which, when executed by the at least one processor of the electronic device, cause the electronic device to:
   while the electronic device is connected with a first communication network, connect with a second communication network via the communication circuitry in response to receiving an add configuration for the second communication network from the first communication network;
   control the display to display a first indicator indicating that the second communication network is connected, in response to connection with the second communication network;
   in response to receiving a message indicating disconnection of the second communication network from the first communication network, measure a parameter of a signal corresponding to an inter-Radio Access Technology (RAT) neighbor cell of the second communication network based on information received from the first communication network;
   obtain a first value by adding a frequency-specific offset of the inter-RAT neighbor cell to the measured parameter and subtracting a hysteresis parameter from the measured parameter;
   obtain a second value by adding the frequency-specific offset and the hysteresis parameter to the measured parameter;
   control the display to continue displaying the first indicator based on the first value exceeding a threshold; and
   control the display to cease displaying the first indicator based on the second value being less than the threshold.

2. The electronic device of claim 1, wherein
   the instructions further cause the electronic device to, as at least part of displaying or not displaying based on the parameter of the signal:
   control the display to continue displaying the first indicator based on the parameter of the signal meeting a report condition; and
   control the display to not display the first indicator and display a second indicator corresponding to the disconnection of the second communication network based on the parameter of the signal not meeting the report condition.

3. The electronic device of claim 2, wherein the parameter of the signal includes at least one of a reference signal received power (RSRP) of the signal, reference signal received quality (RSRQ) of the signal, received signal strength indicator (RSSI) of the signal or signal to noise ratio (SNR) of the signal, and wherein
   the report condition is a B1 event defined in long-term evolution (LTE) or new radio (NR).

4. The electronic device of claim 3, wherein the instructions further cause the electronic device to receive a radio resource control (RRC) connection reconfiguration message for measuring at least one parameter of at least one signal corresponding to the second communication network, and wherein the B1 event is included in one of the RRC connection reconfiguration message or another RRC connection reconfiguration message.

5. The electronic device of claim 2, wherein the instructions further cause the electronic device to, as at least part of controlling the display to display the second indicator corresponding to the disconnection of the second communication network:
   based on identifying that a network corresponding to the first communication network supports dual connectivity with the second communication network, control the display to display an indicator indicating that the second communication network is possible and is disconnected; and
   based on identifying that the network corresponding to the first communication network does not support dual connectivity with the second communication network, control the display to display an indicator indicating that the first communication network is connected.

6. The electronic device of claim 1, wherein the instructions further cause the electronic device to, as at least part of determining whether to display the first indicator based on the parameter of the signal:
   control the display to continue displaying the first indicator, based on the parameter of the signal being reported based on the first communication network as the parameter of the signal meets a report condition; and
   control the display to display a second indicator corresponding to the disconnection of the second communication network, based on the parameter of the signal being not reported as the parameter of the signal does not meet the report condition.

7. The electronic device of claim 1, wherein disconnection of the second communication network is detected, based on detection of a secondary cell group (SCG) failure event corresponding to the second communication network.

8. The electronic device of claim 1, wherein disconnection of the second communication network is detected, based on reception of an RRC connection reconfiguration message corresponding to an SCG release.

9. The electronic device of claim 1, wherein measuring the parameter of the signal and displaying or not displaying the first indicator based on the parameter of the signal further comprises:
   determining whether the parameter meets a report condition a predetermined number of times or at least one or more times within a predetermined time and determining whether to display the first indicator based on a result of the determination.

10. A method for operating an electronic device, the method comprising:
    while the electronic device is connected with a first communication network, connecting with a second communication network in response to receiving an add configuration for the second communication network from the first communication network;
    displaying a first indicator indicating that the second communication network is connected, in response to connection with the second communication network;
    in response to receiving a message indicating disconnection of the second communication network from the first communication network, measuring a parameter of a signal corresponding to an inter-Radio Access Technology (RAT) neighbor cell of the second communication network based on information received from the first communication network;

obtaining a first value by adding a frequency-specific offset of the inter-RAT neighbor cell to the measured parameter and subtracting a hysteresis parameter from the measured parameter;

obtaining a second value by adding the frequency-specific offset and the hysteresis parameter to the measured parameter;

controlling the display to continue displaying the first indicator based on the first value exceeding a threshold; and controlling the display to cease displaying the first indicator based on the second value being less than the threshold.

11. The method of claim 10, wherein displaying or not displaying the first indicator based on the parameter of the signal includes:

continuing displaying the first indicator based on the parameter of the signal meeting a report condition; and displaying a second indicator corresponding to the disconnection of the second communication network, based on the parameter of the signal not meeting the report condition.

12. The method of claim 11, wherein the parameter of the signal includes at least one of a reference signal received power (RSRP) of the signal, reference signal received quality (RSRQ) of the signal, received signal strength indicator (RSSI) of the signal or signal to noise ratio (SNR) of the signal, and wherein the report condition is a B1 event defined in long-term evolution (LTE) or new radio (NR).

13. The method of claim 12, further comprising receiving a radio resource control (RRC) connection reconfiguration message for measuring at least one parameter of at least one signal corresponding to the second communication network, and wherein the B1 event is included in one of the RRC connection reconfiguration message or another RRC connection reconfiguration message.

14. The method of claim 11, wherein displaying the second indicator corresponding to the disconnection of the second communication network includes:

based on identifying that a network corresponding to the first communication network supports dual connectivity with the second communication network, displaying an indicator indicating that the second communication network is possible and is disconnected; and based on identifying that the network corresponding to the first communication network does not support dual connectivity with the second communication network, displaying an indicator indicating that the first communication network is connected.

15. The method of claim 10, wherein determining whether to display the first indicator based on the parameter of the signal includes:

continuing displaying the first indicator, based on the parameter of the signal being reported based on the first communication network as the parameter of the signal meets a report condition; and displaying a second indicator corresponding to the disconnection of the second communication network, based on the signal not meeting the report condition.

16. The method of claim 10, further comprising detecting the disconnection of the second communication network comprises detecting a secondary cell group (SCG) failure event corresponding to the second communication network.

17. The method of claim 10, further comprising detecting the disconnection of the second communication network further comprises reception of an RRC connection reconfiguration message corresponding to an SCG release.

18. The method of claim 10, wherein measuring the parameter of the signal and displaying or not displaying the first indicator based on the parameter of the signal includes:

determining whether the parameter meets a report condition a predetermined number of times or at least one or more times within a predetermined time and determining whether to display the first indicator based on a result of the determination.

19. An electronic device, comprising:
a display; and
at least one processor, wherein
the at least one processor is configured to:
control the display to display a first indicator indicating that second communication network is connected, while a first communication network and the second communication network are connected;
based on a disconnection of the second communication network,
control the display to continue displaying the first indicator based on a parameter of a signal, which corresponds to an inter-Radio Access Technology (RAT) neighbor cell of the second communication network, meeting a predetermined condition; and
control the display to display a second indicator indicating that the second communication network is disconnected, based on the parameter of the signal, which corresponds to the second communication network, not meeting the predetermined condition,
wherein, to determine whether the parameter of the signal meets the predetermined condition, the at least one processor is further configured to:
obtain a first value by adding a frequency-specific offset of the inter-RAT neighbor cell to the parameter of the signal and subtracting a hysteresis parameter from the parameter of the signal;
obtain a second value by adding the frequency-specific offset and the hysteresis parameter to the parameter of the signal;
determine that the parameter of the signal meets the predetermined condition when the first value exceeds a threshold; and
determine that the parameter of the signal fails to meet the predetermined condition when the second value is less than the threshold.

20. The electronic device of claim 19, wherein the at least one processor is configured to determine whether the signal corresponding to the second communication network meets the predetermined condition, depending on whether at least one of an RSRP or RSRQ of the signal corresponding to the second communication network is reported to the first communication network, based on whether at least one of the RSRP or RSRQ meets a report condition included in an RRC connection reconfiguration message received by the electronic device.

* * * * *